United States Patent [19]

Emery et al.

[11] Patent Number: 5,353,331
[45] Date of Patent: Oct. 4, 1994

[54] PERSONAL COMMUNICATIONS SERVICE USING WIRELINE/WIRELESS INTEGRATION

[75] Inventors: Mark J. Emery, Herndon, Va.; Brenda N. Tucker, Mitchellville; Laurie D. Schwartz, Garrett Park, both of Md.

[73] Assignee: Bell Atlantic Network Services, Inc., Arlington, Va.

[21] Appl. No.: 845,924

[22] Filed: Mar. 5, 1992

[51] Int. Cl.⁵ .................... H04M 11/00; H04M 1/64; H04Q 7/00; H04B 1/00

[52] U.S. Cl. .................... 379/58; 379/59; 379/60; 379/67; 379/91; 455/33.1; 455/54.1

[58] Field of Search .................... 379/58, 59, 60, 67, 379/91; 455/33.1, 54.1

[56] References Cited

U.S. PATENT DOCUMENTS

| | | | |
|---|---|---|---|
| 4,178,476 | 12/1979 | Frost . | |
| 4,191,860 | 3/1980 | Weber . | |
| 4,313,035 | 1/1982 | Jordan et al. . | |
| 4,562,572 | 12/1985 | Goldman et al. | 455/33 |
| 4,611,094 | 9/1986 | Asmuth et al. . | |
| 4,611,096 | 9/1986 | Asmuth et al. . | |
| 4,654,879 | 3/1987 | Goldman et al. | 455/33.2 |
| 4,658,416 | 4/1987 | Tanaka | 379/60 |
| 4,680,785 | 7/1987 | Akiyama et al. | 379/57 |
| 4,748,655 | 5/1988 | Thrower et al. | 379/60 |
| 4,752,951 | 6/1988 | Konneker | 379/57 |
| 4,756,020 | 7/1988 | Fodale . | |
| 4,757,267 | 7/1988 | Riskin . | |
| 4,775,997 | 10/1988 | West, Jr. et al. | 379/63 |
| 4,788,718 | 11/1988 | McNabb et al. . | |
| 4,852,148 | 7/1989 | Shibata et al. | 379/59 |
| 4,878,243 | 10/1989 | Hashimoto | 379/67 |
| 4,899,373 | 2/1990 | Lee et al. . | |
| 4,932,042 | 6/1990 | Baral et al. | 379/67 |
| 4,980,907 | 12/1990 | Raith et al. | 379/63 |
| 5,040,177 | 8/1991 | Martin et al. | 370/110.1 |
| 5,090,050 | 2/1992 | Heffernan . | |
| 5,090,051 | 2/1992 | Muppidi et al. . | |
| 5,127,042 | 6/1992 | Gillig et al. | 379/59 |
| 5,144,649 | 9/1992 | Zicker et al. | 379/59 |
| 5,153,907 | 10/1992 | Pugh et al. | 379/143 |
| 5,157,709 | 10/1992 | Ohteru | 379/58 |
| 5,197,092 | 3/1993 | Bamburak | 379/59 |
| 5,216,703 | 6/1993 | Roy | 379/59 |
| 5,251,248 | 10/1993 | Tokunaga et al. | 379/58 |
| 5,259,018 | 11/1993 | Grimmet et al. | 379/58 |
| 5,260,987 | 11/1993 | Mauger | 379/58 |
| 5,272,747 | 12/1993 | Meads | 379/144 |

FOREIGN PATENT DOCUMENTS 2193861 2/1988 United Kingdom .

OTHER PUBLICATIONS

Donogue et al., entitled "The Building of Intelligent Networks–Architecture and Systems for Alcatel", *Communication & Transmission*, (No. 2-1989) pp. 5-22, published by SOTELEC, Paris, France.
Wites, "Calling Party Pays".
EMX Electronic Switching Equipment; Motorola.

*Primary Examiner*—Stephen Chin
*Assistant Examiner*—Vijay Shankar
*Attorney, Agent, or Firm*—Lowe, Price, LeBlanc & Becker

[57] ABSTRACT

The Advanced Intelligent Network (AIN) wireline system connects to and controls processing of calls to a Personal Communication Service subscriber's wireless handset via a home base station or a wireless communication network. Depending on its current location, the subscriber's handset automatically registers with the base station or with a mobility controller of the wireless network. A new registration with the base station when the handset comes within range causes that station to update the subscriber's home location register in a central data base of the AIN. Similarly, when a handset first registers with a mobility controller, that controller updates the subscriber's home location register in the central data base of the AIN. In response to calls directed to the subscriber, the AIN accesses the home location register to determine the current location where the handset is registered. The AIN then uses that data to route the call to the current location. In response to calls from the handset, the central data base provides instruction data to the land line network and/or a mobility controller to extend a requested special service to the calling subscriber.

44 Claims, 9 Drawing Sheets

CONTROL CHANNEL CONFIGURATION

PERSONAL COMMUNICATIONS SERVICE USING WIRELINE/WIRELESS INTEGRATION

TECHNICAL FIELD

The present invention relates to a personal communication service allowing a user to send and receive calls from a single portable handset using a single assigned number whether at home or roaming. The present invention provides method and system structures for interfacing the capabilities of a land line telephone system with a radio link communication system, using a land line Advanced Intelligent Network (AIN). In particular, the new system would control the provision of private network service features to users of both radio link systems and land line systems to provide unbroken, or seamless, access to a variety of different types of communications systems linked to the inventive system.

ACRONYMS

The written description uses a large number of acronyms to refer to various services and system components. Although known, use of several of these acronyms is not strictly standardized in the art. For purposes of this discussion, acronyms therefore will be defined as follows:

Action Control Point (ACP)
Advanced Intelligent Network (AIN)
Advanced Services Platform (ASP)
Authentication Center (AC)
Base Station (BS)
Cellular Subscriber Station (CSS)
Common Channel Inter-office Signalling (CCIS)
Dual Tone Multifrequency (DTMF)
Data and Reporting System (D&RS)
Equipment Identity Register (EIR)
Home Location Register (HLR)
Integrated Service Control Point (ISCP)
Intelligent Peripheral (IP)
Local Access and Transport Area (LATA)
Low-Power Self Contained Cell (LPSC)
Mobile Identification Number (MIN)
Mobility Controller (MC)
Mobile Switching Center (MSC)
Mobile Telephone Switching Office (MTSO)
Overhead Message Train (OMT)
Personal Base Station (PBS)
Personal Communication Service (PCS)
Plain Old Telephone Service (POTS)
Private Branch Exchange (PBX)
Private Automatic Branch Exchange (PABX)
Public Switched Telephone Network (PSTN)
Service Control Point (SCP)
Service Management System (SMS)
Service Switching Point (SSP)
Signalling Transfer Point (STP)
Station Message Detail Recording (SMDR)
Service Creation Environment (SCE)
Telephone Company (TELCO)
Temporary Local Directory Number (TLDN)
Transaction Capabilities Applications Protocol (TCAP)
Visitor Location Register (VLR)
Wireless Private Branch Exchange (WPBX)

BACKGROUND ART

The Advanced Intelligent Network (AIN) provides centralized control of telephone services provided to subscribers through diversely located central office switching systems. In an AIN type system, central offices send and receive data messages from an Intelligent Services Control Point (ISCP) via a Switching Transfer Point (STP). At least some calls are then controlled through multiple central office switches using data retrieved from a data base in the ISCP. In recent years, a number of new service features have been provided by the Advanced Intelligent Network (AIN).

U.S. Pat. No. 4,756,020 issued Jul. 5, 1988, to Joseph V. Fodale, for example, suggests access authorization in a multiple office environment. The Fodale system restricts access to a long distance telephone network based on the status of the billing number associated with the call, i.e. delinquent. The access control is provided through multiple local and toll offices but is centrally controlled by a data base which stores account status information. The local office serving a calling telephone extends a toll call to the toll office of the toll network carrier. The toll office queries the data base via a CCIS link regarding the current status of the customer's account identified by the billing number associated with the call. The data base obtains the status information of the billing number in question and translates that status into a response message instruction to allow or disallow extension of the toll call through the toll network. The data base transmits the response message to the toll office via CCIS link, and the toll office disallows or extends the call through the toll network as instructed by the response message.

A number of the features provided by the prior art AIN type intelligent networks relate to specialized call processing of incoming calls, as discussed below.

U.S. Pat. No. 4,191,860 issued Mar. 4, 1980, to Roy P. Weber discloses a system for providing special processing of incoming calls via a number of local switching offices based on information stored in a central data base. The local and toll offices of the telephone network compile a call data message and forward that message via a CCIS link to the central data base, essentially a Service Control Point or SCP. The data base at the SCP translates the dialed INWATS number, included in the message, into a call control message. The call control message includes an unlisted destination telephone number, which is then returned to the offices of the network via CCIS link. The network uses the call control message to complete the particular call.

U.S. Pat. Nos. 4,611,094 and 4,611,096 both to Asmuth et al. disclose a system for providing custom incoming telephone call processing services to a corporate customer operating at geographically dispersed locations through a plurality of local office switches. A customer program stored in a central data base is accessed to provide instructions to the switches to complete incoming calls to customer locations in accord with special services defined by the corporate customer. Incoming calls to the customer are routed to an Action Control Point (ACP) which typically is a modified toll office. The ACP has a number of "primitive" call processing capabilities, such as providing voice prompts to callers and receiving additional caller inputs. The customer program controls the ACP's to string together the desired primitive call processing capabilities to process each call to the customer. Specified parameters stored in the program, such as time of day, caller location and data inputs responsive to the voice prompts, determine the final customer station to which each call should be completed. The customized call processing disclosed by Asmuth et al. can also include customized billing for calls, e.g., by splitting charges between the customer and the caller. The Asmuth et al. system sets up a billing record for each call in the ACP or toll office. Asmuth et al. also teach procedures for handling of calls directed to a corporate customer when the call serving office does not have all of the capabilities needed for processing the call in accord with the customer's stored program. In particular, upon recognition of the deficiencies of the call serving office, the Asmuth et al. system transfers call processing to a second office having adequate capabilities for completion of the call.

U.S. Pat. No. 4,788,718 issued Nov. 29, 1988, to Sandra D. McNabb et al. suggests centralized recording of call traffic information. The architecture is similar to that disclosed by the earlier discussed patents to Weber and Asmuth et al. to the extent that local and toll offices communicate with a central data base via CCIS link. The McNabb et al. system improves over the incoming call routing provided by the Weber patent and the two Asmuth et al. patents discussed above by adding a data gathering function to the centralized data base which stores the individual customer's call routing program. In McNabb et al. the central data processor provides call attempt records and a traffic data summary of all calls directed to a particular 800 number.

U.S. Pat. No. 4,757,267 issued Jul. 12, 1988, to Bernard J. Riskin teaches routing of an 800 number call, where the dialed number identifies a particular product or service, to the nearest dealer for the identified product or service. The toll office sends a message including the dialed 800 number and the area code of the caller to a data base which translates this into a standard ten digit telephone number for the nearest computer at a Customer/Dealer Service Company (CDSC). The telephone network then routes the call to this computer, which answers the call and provides a synthesized voice response. The computer uses call data and or Touch-tone dialed information from the caller to identify the selected product or service and then accesses its own data base to find the telephone number of one or more nearby dealers in that product or service. The computer then calls the dealer and connects the original caller to the called dealer.

Several other patents use a network similar to the AIN type intelligent network to provide personalized services to individual subscribers, for example when they are away from their home telephone station.

U.S. Pat. No. 4,313,035 issued Jan. 26, 1982, to David S. Jordan et al. patent discloses a method of providing a person locator service through multiple exchanges of the switched telephone network. Each subscriber is assigned a personal number uniquely identifying the subscriber. An absent subscriber inputs a number to which calls are to be completed, such as the number where the subscriber can be reached, into a central data base. A caller wishing to reach the subscriber dials the number uniquely identifying that subscriber. In response to an incoming call directed to the unique number, a telephone switching office having access to CCIS sends the dialed number to the central data base referred to by Jordan et al. as an SSP. The data base retrieves the stored completion number for the called subscriber and forwards that number back to the switching office to complete the call. The subscriber can update the stored data from any telephone. Also, the subscriber can specify whether to charge calls via the person locator system to the subscriber or to the caller.

U.S. Pat. No. 4,899,373 issued Feb. 6, 1990, to Chinmei Lee et al. discloses a system for providing special telephone services to a customer on a personal basis, when the customer is away form his or her home base or office. A nationally accessible data base system stores feature data in association with personal identification numbers. A subscriber wishing to use personalized features while away from home base dials a special code from a station connected to any exchange which has access to the data base and presents the personal identification number. The corresponding feature data is retrieved from the data base and stored in the exchange in association with the station from which the request was initiated. The exchange then provides telephone service corresponding to the subscriber's personalized telephone features. A temporary office arrangement may be established in which the personalized features will be immediately available on incoming and outgoing calls for a period of time specified by the subscriber.

Further modifications of the AIN system allow a TELCO to customize the routing of telephone calls via a graphical programming language used on a specialized terminal by telephone company personnel.

As seen from the cited patents, the prior art AIN systems are exclusively land line communications systems, i.e. they provide telephone communication services via wired telephone lines, which to the subscriber typically is a tip and ring pair. The signalling protocol used for AIN allows only for control of telephone network switching elements in response to queries originated by network switching elements. Wired line communications, even those provided by AIN, are necessarily limited by the fixed nature of installed lines. These systems make no provision for communication to any mobile unit.

Separate radio-link communications systems have been developed which generally relied on the TELCO's only to provide trunks and voice communication to and from land line based parties. Operation of the mobility controllers of the mobile or radio network has been controlled entirely within the radio-link communication network.

The most common type of mobile radio link communication systems is the cellular radio telecommunications system (cellular telephone or mobile telephone system). The cellular telecommunications industry has developed roaming standards which when implemented will allow automatic handoffs from one cellular network to another during an established call, and to allow roaming from one system to another while having incoming calls follow the customer to the visited system. The protocol which accomplishes this are set out in the EIA/TIA publications IS-41.1-A, IS-41.2-A, IS-41.3-A, IS-41.4-A, and IS-41.5-A. For example, in all cellular systems conforming to IS-41 Rev. a. registration of an activated roaming mobile station takes place automatically even if a call is not in progress or being requested. The IS-41 protocol is an out-of-band signalling protocol which may be i transported by either X.25 or SS#7 links. No links to the land line network, however, have previously been established for IS-41 signalling.

The link between the mobile cellular user (CSS) and the appropriate base station (BS) uses particular radio frequencies mandated by the FCC. Dedicated trunk lines serve as the link between the base station and the mobile switching center (MSC), and the interface between mobile switching centers within the same system (same cellular provider) is generally provided by dedicated land lines. Data links connect the mobile switching center to a visitor location register (VLR), home location register (HLR), and equipment identity register (EIR), all of which can be located at the mobile switching center or at a remote point. All three registers may serve more than one mobile switching center. The HLR is the location register to which a user identity is assigned for record purposes, such as subscriber information, i.e., directory number, profile information, current location, validation period. The VLR is the location register, other than the HLR, which an MSC temporarily uses to store and retrieve information regarding a visiting subscriber or user. The differences between the VLR and the HLR are moot when handoff of a mobile user or subscriber is limited to the MSCs within a single system (single provider), since all the users are presumed to be listed in the home location register, and are validated on that basis. The VLR becomes important only when a subscriber who is not listed on the HLR of a cellular provider enters the system and registers. This situation is commonly described as roaming.

After determining that a roaming subscriber is currently within its surface area, the serving MSC sends a REGNOT (registration notification) to its VLR. The new serving MSC may detect a roaming subscriber's presence through automatic autonomous registration without a call request, call origination, call termination (such as a page response following a call to the roamer port), or a service order. If the roaming subscriber had previously registered with an MSC within the domain of the VLR, the VLR may take no further action other than to record the identity of the MSC currently serving the roaming subscriber. If the roaming subscriber was previously unknown to the VLR, or if the MSC registered information not available at the VLR, the VLR sends an REGNOT signal to the HLR associated with the roaming subscriber. The MSC recognizes this association based on the mobile identification number (MIN) reported by the roaming subscriber's mobil communication unit upon entering the new service area. The REGNOT signal sent from the VLR to the MSC may be contingent upon the response received from the HLR. For example, the roaming subscriber may not currently be a valid subscriber of the system in which the HLR is located.

If the roaming subscriber was previously registered elsewhere, the HLR sends a REGCANC (registration cancellation) signal to the previously visited VLR. That VLR (old serving system), upon receipt of the cancellation message, essentially removes all record of the roaming subscriber from its memory. The REGCANC signal can be sent by the HLR at any time after it receives the REGNOT signal. The new serving VLR creates an entry for the roaming subscriber in its internal data structure and may send a QUALREQ (qualification request) signal to the HLR in order to authenticate the roaming subscriber and determine the validation requirements. The VLR, if required, may then send a PROFREQ (service profile request) signal to the HLR to obtain the service profile for the roaming subscriber.

Many mobility controllers of the above described cellular systems are now programmed to provide subscribers selected special services. Normally, roaming subscribers engaged in "feature calls" which require special support by the system will not be handed off between systems. If the mobile subscriber has roamed to another system and registered on that system, normally the special features will not necessarily be allowed to the roamer. Normally handoff of a roaming subscriber in the "on-hook" state (not engaged in a call) will not take place when moving to a new system. Further, path minimization which is often found in the control scheme of a single system may not be provided for when a handoff of a roaming user from one system to another occurs. Thus, special services or features available to a subscriber through the home system are not available when the subscriber roams through other systems.

Data networks, such as X.25 packet switched networks, interconnect the mobility controllers with each other for data communications, for example to transfer necessary data from a subscriber's HLR to a VLR in the mobility controller the subscriber's mobile station is currently communicating with. The IS-41 protocols used by the mobile communications networks, however, have not been compatible with the protocols used to communicate between SSP's and the ISCP of the land based Advanced Intelligent Network.

There have been efforts to interface the two kinds of telephone device to provide unbroken access to at least one communication system at all times. One such arrangement is the well known cordless telephone. This telephone includes both a handset having a radio transceiver and a base station having a transceiver. The base unit connects to a land line system. A DTMF dialer in the base responds to control signals received through the base station transceiver to request telephone services, e.g., place a call. When an outgoing call is desired, a data stream is output from the handset over a radio link to the base station, initiating an interrogation routine in which the identity of the handset (usually required or programmed into a handset microprocessor) is confirmed at the base station. The desired telephone number is punched into a key set on the handset and output as a data stream. This data stream is received by the base unit and converted for use on the land line telephone system as DTMF signals.

Typically, both handset and base station include a microprocessor to control operations thereof. These operations include a registration between the handset and the base station before the base station will establish communication with the land line.

Registration can occur automatically when a handset enters the area of a base station. Alternatively, the registration between handset and base unit can occur when an incoming land line call is received by the base station or when the user seeks to make an outgoing call.

Since cordless telephones are generally controlled by microprocessors, a wide variety of functions such as intercom, three-way conversations, memory dialing, answering machine functions, and timed-automatic dial-out, are available. Also, since the base unit connects to a standard telephone, telephone network special services, such as those provided by AIN, are available to the handset via its associated base unit. Cordless handsets, however, use very little power and consequently have a very limited range with respect to the base station and consequently have limited range. Also, cordless telephone systems generally operate at different frequencies than those used by cellular telephone systems or microcell systems so that the cordless set cannot roam through the cellular network.

An essential problem with all of these systems is that they are not universal. Some environments require the use of one kind of system while precluding the use of others. For example, a moving vehicle requires the use of a cellular system and precludes the use of a direct land line connection. The expense of a cellular system, however, makes the use of a fixed land line far more practical when the user is at a stationary location. Even at a stationary location, such as one's home, a user cannot remain constantly within earshot of a telephone. Consequently, the use of a cordless handset system becomes necessary to one who wishes to move about while maintaining access to a communications system. Since the cordless telephone system does not interface with the cellular telephone system, the user much switch systems when changing environments, entailing an interruption of access to communications systems and requiring additional costly equipment as well as necessitating the use of an additional telephone number. Further, special features available and often relied upon in one system are often not transferrable to another system. Consequently, the user must readjust his mode of communicating to compensate for changes in the features available on each type of communication system.

From the above discussion, it becomes clear that the AIN provides one set of services to land line customers and the mobile communication system provides a different independent set of services. A subscriber wanting access to both types of services had to subscribe to both and typically was assigned two independent numbers, i.e. telephone numbers, at which to receive calls via each network. Such dual independent subscription increased costs to the subscriber and made it difficult for callers to know which number to use to currently reach the subscriber. Also, the wide variety of service features available to the subscriber via the AIN were not readily available to the subscriber via the mobile communication network, and those special service features available to the mobile subscriber were available only to the home cellular system.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DISCLOSURE OF THE INVENTION

1. Objectives

One objective of the present invention is to provide a communication service which is adaptable to each user's individual life style. This means that the user should be able to customize the service to suit their personal needs and when necessary the predefined service for each customer should follow that customer as he or she moves to new locations.

Another objective of the present invention is to provide communications services via both land based communications lines and radio links in such a manner that the services appear seamless across boundaries of the land line network and the radio link network. More specifically, each service should appear the same to the individual user, whether the user accesses the service via land line or via radio link. Communication services not normally available to mobile users are made available using the present invention.

One more specific object is to provide calls to a person whether that person is at home or away from home using a single telephone number assigned to that person.

Another objective is to maintain access to a communications system by a user having a single handset regardless of user movement.

2. Summary of the Invention

The present invention provides centralized control of call processing by both telephone central office switching systems and wireless mobility controllers based on call processing data associated with individual subscribers stored in a central service control point, or data base, within the telephone network. This centralized call processing control can provide call routing to either a land line or a wireless unit via a mobility controller, in response to calls directed to a single number. The system can also extend special services normally provided to land lines by the telephone central office switches to any line of the system designated by subscriber registration and to mobile units operating in the wireless portion of the network. Thus, the invention allows the individual user to control the delivery of telecommunications services to meet their personal life style and to virtually any geographic location, covered by the network, to which the user roams.

The integrated wired and wireless communication network of the present invention includes communication lines and a central office switching system connected to communication lines selectively providing switched communication connections between the communication lines. A mobility controller selectively provides wireless communications to and from mobile communication units. Communication trunks interconnect the central office switching system and the mobility controller, and the mobility controller selectively provides switched communications between the communication trunks and wireless mobile communication units. A network controller, separate from the central office switching system and the mobility controller, stores call processing data for subscribers who are associated with one of the communication lines connected to the central office switching system and for subscribers associated with one of the mobile communication units. Call processing by both the central office switching system and the mobility controller to establish a completed communication link is controlled in response to the stored call processing data associated with at least one of the subscribers.

In one aspect, the invention provides a method by which the integrated system recognizes calls directed to an assigned subscriber number and accesses data stored in the central network controller to determine a line to a switching system or a mobility controller at which the subscriber last registered.

The programmability of the subscriber's service data within the network controller allows the subscriber to design call screening procedures to selectively route certain calls to other termination points, such as a voice mailbox. As another example, the system could provide a voice prompt asking certain callers if they are willing to pay for toll charges through long distance lines or for air time through the wireless part of the network. The system would complete the call only if the caller dialed in digits indicating assent to such charges and would add the charges to the caller's bill. The system also allows a subscriber to specify points to route calls to if the line and/or mobile communication unit are busy, for example to a different station such as might be assigned to a secretary. The invention also provides several systems for adding or modifying subscriber data stored in the central network controller's data base.

The invention also includes method and apparatus for conducting registration procedures to inform the central network controller where the subscriber currently is located. A wireless base unit connected to a telephone line registers with the mobile communication unit when the mobile unit comes within range, and the base unit automatically dials and informs the central network controller of the registration. Similarly, when the portable unit first registers with a mobility controller, the mobility controller informs the network controller of the new registration.

When the system includes two central service controllers, often referred to as ISCP's, the invention also provides special procedures for exchange of data between the central controllers so that switching systems and mobility controllers communicate only with the central controller in their area. This prevents transmission of call processing instructions from a remote service controller to a switching system or mobility controller which might cause errant operation. In the preferred embodiment, the present invention designates the central controller or ISCP in the subscriber's home region as the source of that subscriber's Home Location Register (HLR) data. Also, each of the central controllers is set up to include Visiting Location Register (VLR) capability. When a subscriber traveling in a region other than his home region registers with a central controller outside her home region, through either a telephone registration procedure or a mobility controller registration procedure, that central controller establishes a VLR for that visiting subscriber. When switching systems or mobility controllers in the visited area need data regarding the visiting subscriber, they access the VLR in the central controller within that area.

BEST MODE FOR CARRYING OUT THE INVENTION

The Personal Communication Service or "PCS" of the present invention uses an Advanced Intelligent Network (AIN) type architecture together with elements of a mobile communication system, such as a cellular radio-telephone network. One conceptual example of an AIN and cellular system for implementing the PCS service appears in simplified block diagram form in FIG. 1.

Figure 1:
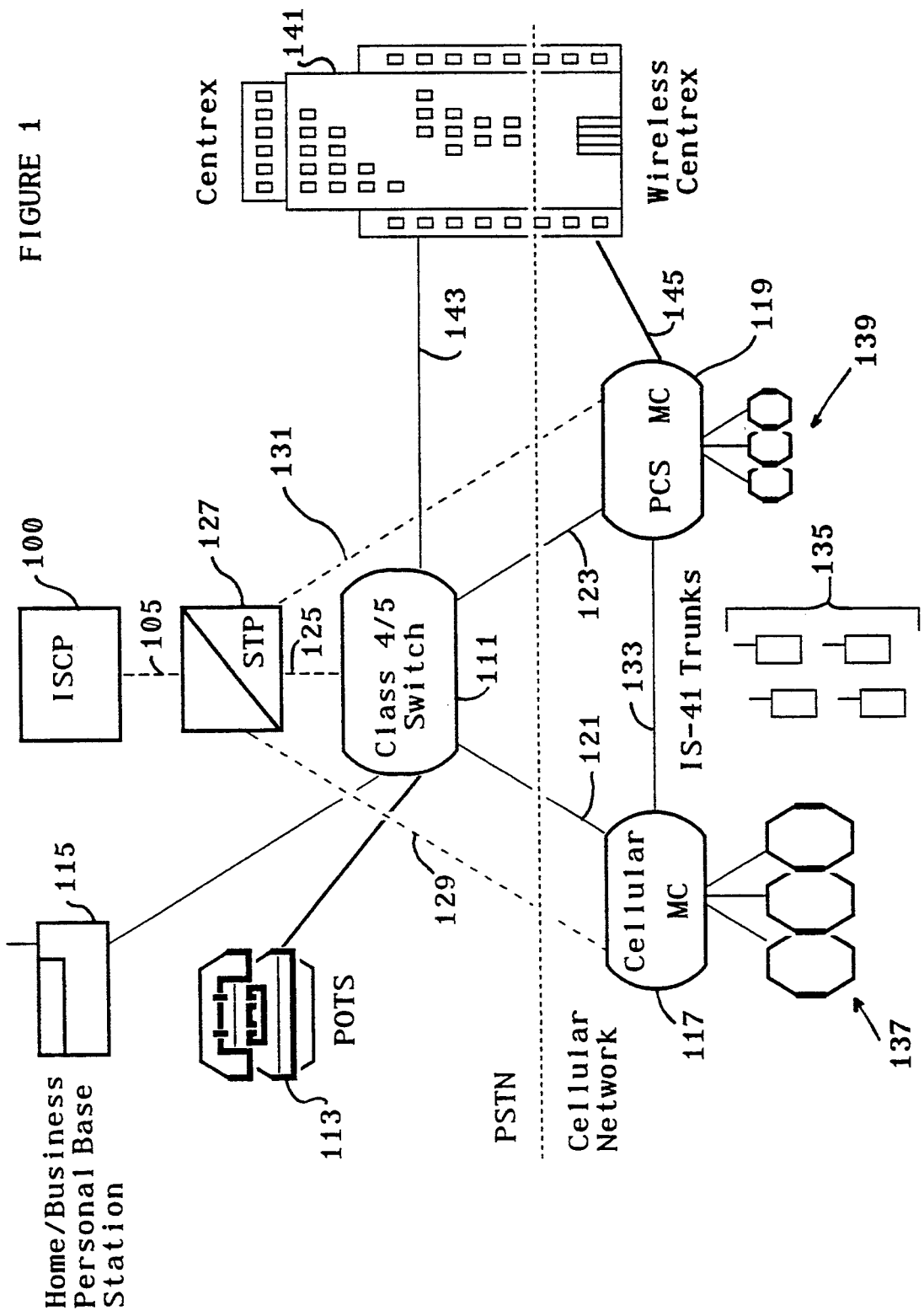
FIG. 1 provides a conceptualized illustration, in general block diagram form, of the communication system for implementing the Personal Communication Service.

In the simplified example of FIG. 1, one or more central office switches, such as the class 4/5 Switch 111, are located throughout a state or region served by a TELCO providing the Personal Communication Service. Local telephone lines connect the central office switch 111 to individual telephone terminals in each geographic area, for example to the Plain Old Telephone Service (POTS) phone 113 and the base station 115 (described in detail below).

Figure 2:
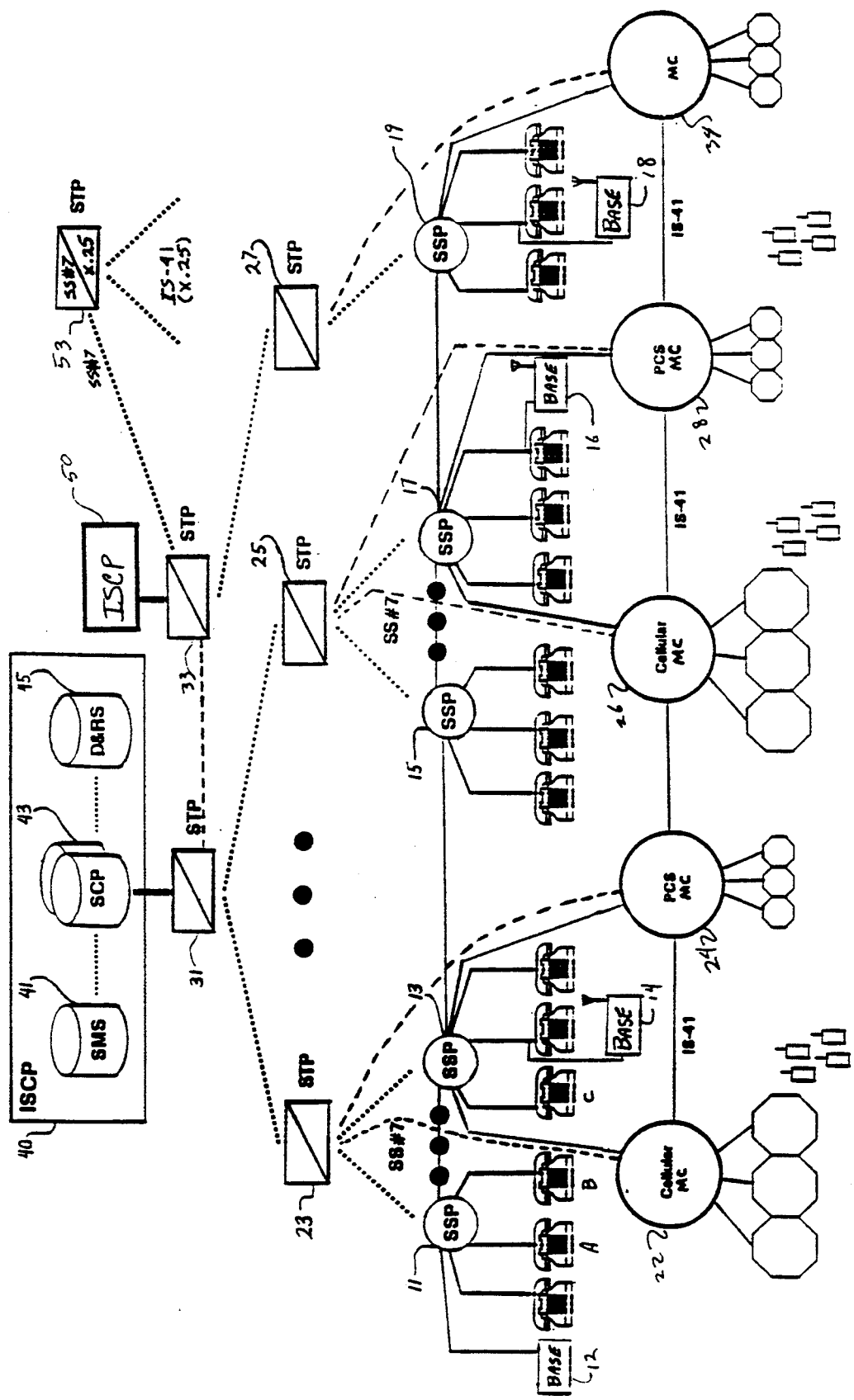
FIG. 2 is a more specific block diagram of one embodiment of the integrated land line and wireless communication system used in the present invention.

Although shown as telephones in FIGS. 1 and 2, the terminals can comprise any communication device compatible with the line. Where the line is a standard voice grade telephone line, for example, the terminals could include facsimile devices, modems etc. Similarly, the portable handsets can incorporate both standard telephone communication components and other communication devices. In fact, the portable units may not be handsets at all. If desired, the portable unit may comprise any communication device compatible with the system, for example portable facsimile devices, laptop computers, etc.

The preferred embodiments described herein provide the wireless communication services via radio links using frequencies assigned to cellular communications networks. Other types of wireless communication, however, could be substituted for the radio communication systems. For example, the invention could use a series of radio relay transponders, an infrared system or a satellite based system to provide one or more of the wireless links.

The Switch 111 connects via trunk circuits 121, 123 to one or more Mobility Controllers (MC's), such as the Cellular MC 117 and the PCS MC 119. As described in more detail with reference to FIG. 2, each central office will also connect via trunk circuits to one or more remote central offices. The trunk circuits carry large numbers of telephone calls between central offices and/or between a central office and the mobility controllers. Also, each central office has a Common Channel Inter-office Signalling (CCIS) type data link 125 going to a Signalling Transfer Point or "STP" 127. CCIS type data links 129 and 131 provide data communication for PCS and related special service processing between the MC's 117, 119 and the STP 127. Also, a CCIS packet switched data link 105 connects the STP 127 to an Integrated Serves Control Point (ISCP) 100.

Each MC connects to antennas for a number of cell cites to provide wireless communication services to PCS portable handsets 135 and/or other wireless mobile communication devices. In the example shown, Cellular MC 117 controls communications via a number of macrocells 137. PCS MC 119 controls communications via a number of microcells 139. The MC's 117, 119 are also interconnected with each other by IS-41 data trunks 133, and may be interconnected via voice trunks (not separately shown) essentially running in parallel with the IS-41 trunks 133.

To provide land line type centrex services for a business customer, the switch 111 provides a land line connection 143 to the customer's premises 141. The land line link would actually include a number of telephone lines connected to various types of conventional telephone terminal devices. To provide wireless centrex services to a particular location, which may be the same customer premises 141, lines 145 connect the PCS MC 119 to macrocell antennae within the customer's building. Although shown as a single building, the integrated Centrex could cover a broader area, for example an entire college campus. The PCS system can integrate a customer's existing wireline-based Centrex or PBX services with a wireless version of those services. PCS will allow four digit dialing of the personal Centrex or PBX number, and it will recognize when the personal user is located within a unique wireless environment based upon registration information sent to it by the wireless Centrex/PBX provider for delivery of calls. Calls to the Centrex/PBX number will be automatically routed to wherever the personal user is, be it wired or wireless and on any connecting network.

System Architecture

FIG. 2 is a schematic block diagram of the components of AIN type integrated land line and wireless system, similar to the system of FIG. 1, but showing somewhat more detail of the preferred embodiment of the system for implementing the invention. In this figure, each of the CO switches are labeled as an "SSP." These Service Switching Points, referred to as SSP's, are appropriately equipped programmable switches present in the telephone network, which recognize AIN type calls, launch queries to the ISCP and receive con, hands and data from the ISCP to further process the AIN calls.

SSP's can be programmed to recognize a number of different triggers as an indication that a call is an AIN call. For example, the trigger can relate to the identification of the telephone line from which a call or other request for service originates, and such a trigger is useful for activating certain services to be discussed later. At least initially, however, for incoming PCS type calls the trigger is based on a recognition that the terminating station identified by the destination number is a PCS subscriber.

As shown in FIG. 2, all of the CO's 11, 13, 15, 17 and 19 are equipped and programmed to serve as SSP's. Such central office switching systems typically consist of the above discussed class 4/5 programmable digital switch with CCIS communications capabilities. One current example of such a switch is a 5ESS type switch manufactured by AT&T; but other vendors, such as Northern Telecom and Seimens, manufacture comparable digital switches which could serve as the SSP's. The illustrated embodiment is perhaps an ideal implementation which would make the Personal Communication Service widely available at the local office level throughout the network. As will be discussed later, other implementations provide the SSP functionality only at selected points in the network, and telephone end offices without such functionality forward calls to one of the SSP's.

A number of subscriber telephone lines connect to each of the SSP's which provide switched telephone communications services to subscriber terminals coupled to those telephone lines. Many of the TELCO's subscriber's will still have ordinary telephone terminals, as shown. Those who subscribe to PCS will have a home base unit, such as shown at 12, 14, 16 and 18. The base unit may be the only terminal device connected to a particular telephone line, as is base unit 12, or the base may connect to the line in parallel with one or more standard telephone station sets as does base unit 14.

To provide wireless mobile communications, the network further includes a number of Mobility Controllers or "MC's" which communicate with the SSP's, STP's and ISCP of the AIN type telephone network. As shown in the drawing, the network includes cellular MC's 22 and 26 and MC's 24 and 28 constructed specifically for PCS. Each of the MC's connects to an SSP type central office switch via a voice telephone trunk, shown in solid lines. MC's 22, 24, 26 and 28 each also connect to one of the STP's via an SS#7 link.

The system for implementing Personal Communication Service in one telephone company service area or perhaps one LATA includes a number of the SSP capable CO switches, such as the SSP's shown at 11, 13, 15, and 17. The SSP type central offices are each at a different location and distributed throughout the area or region served by the Personal Communication Service system. The PCS system of one regional TELCO will connect to networks serving other regions, for example the networks of other TELCO's. The switch 19 in FIG. 2 represents one of the SSP switches of a second TELCO implementing a PCS service.

The SSP's 11 and 13 connect to a first local area STP 23, and the SSP's 15 and 17 connect to a second local area STP 25. The connections to the STP's are for signalling purposes. As indicated by the black dots below STP's 23 and 25, each local area STP can connect to a large number of the SSP's. As shown by solid lines in FIG. 2, the central offices or SSP's are interconnected to each other by trunk circuits for carrying telephone services.

The local area STP's 23 and 25, and any number of other such local area STP's, shown as black dots between STP's 23 and 25, communicate with a state or regional STP 31. The state or regional STP 31 in turn provides communications with the TELCO's ISCP 40. The STP hierarchy can be expanded or contracted to as many levels as needed to serve any size area covered by the Personal Communication Service and to service any number of stations, central office switches, mobility controllers and mobile communication units.

The links between the SSP's and the local area STP's are CCIS links, typically SS#7 type interoffice data communication channels. The local area STP's are in turn connected to each other and to the regional STP 31 via an SS#7 packet switched network. The regional STP 31 also communicates with the ISCP's 40 via a packet switched network communications.

The network of the second TELCO can have an architecture essentially similar to that described above. For example, as shown in FIG. 2 the SSP 19 connects to a first local area STP 27 via an SS#7 link, and SSP 19 connects to one or more central offices or SSP's including SSP 17 by means of trunk circuits for carrying telephone services. The local area STP 27 communicates with a state or regional STP 33 of the second TELCO. The STP 33 provides CCIS type data communications with the second TELCO's ISCP 50 and with the SSP's and ISCP's of other TELCO's, for example by packet switched connection to STP 31. The link between the SSP 19 and the local area STP is a CCIS link, typically an SS#7 type interoffice data communication channel.

The local area STP is connected to the regional STP 33 via a packet switched network also typically SS#7. The regional STP 33 also communicates with the ISCP 50 via a packet switched network. The second TELCO's network further includes a number of MC's such as MC 34, each of which will communicate with the SSP's, STP's and ISCP of the AIN type telephone network. Like the MC's of the first TELCO, MC 34 connects to an SSP 19 via a voice telephone trunk, shown as a solid line. MC 34 also connects to the local area STP 27 via an SS#7 link.

The above described data signalling network between the CO's and the ISCP is preferred, but other signalling networks could be used. For example, instead of the CCIS links, STP's and packet networks, a number of MC's together with several CO's and an ISCP could be linked for data communication by a token ring network. Also, the SSP capability may not always be available at the local office level, and several other implementations might be used to provide the requisite SSP capability. For example, none of the end office switches may have SSP functionality. Instead, each end office would connect to a trunk tandem which in turn feeds calls to a central SSP capable switch. The SSP then communicates with the ISCP, as in the implementation described above, but in this case via an SS#7 type CCIS link. In another embodiment, some of the end offices are SSP capable, and some are not. Again, each of the end offices normally communicates through a trunk tandem. For the SSP capable switches, they communicate directly with an STP which relays communications to and from the ISCP, in the same manner as in the embodiment of FIGS. 1 and 2. For those end offices which lack SSP capability, calls are forwarded to the SSP capable trunk tandem which in turn relays data to and from the ISCP. In these alternate embodiments, the SSP capable trunk tandem switches are digital switches, such as the 5ESS switch from AT&T; and the non-SSP type end offices might be 1A analog type switches.

The MC's are connected with each other via IS-41 protocol trunks for exchange of data relating to handoff and to exchange of data for extending services to visiting subscribers of distant cellular systems who are not subscribers to PCS. The IS-41 data trunks are actually a packet switched network, which may be either an X.25 network or an SS#7 network. To provide handoff during a wireless call in progress, the MC's are also interconnected via trunk circuits (not shown).

To allow data communication of HLR data registered in the ISCP's 40, 50, to visitor location registers in remote MC's, the network further includes a hub STP 53. The hub STP connects to an X.25 packet switched data network, which currently carries IS-41 data messages between existing MC's outside the PCS service area. The hub STP 53 couples IS-41 messages between the X.25 network and the SS#7 network, shown by the dotted line data communication link to the regional STP 33. The communication through the hub STP 53 allows outside MC's to communicate with the ISCP's of both TELCO's providing the PCS type services as if the ISCP's 40, 50 were home location MC's for the PCS subscribers when PCS subscriber is visiting another service area.

The messages transmitted between the SSP's and the ISCP's are all formatted in accord with the Transaction Capabilities Applications Protocol (TCAP). The TCAP protocol provides standardized formats for various query and response messages. Each query and response includes data fields for a variety of different pieces of information relating to the current call. Of particular note here, an initial TCAP query from the SSP includes, among other data, a "Service Key" which is the calling party's address and digits representing the called party address. TCAP also specifies a standard message response format including routing information, such as primary carrier ID, alternate carrier ID and second alternate carrier ID and a routing number and a destination number. The TCAP specifies a number of additional message formats, for example a format for a subsequent query from the SSP, and formats for "INVOKE" responses for instructing the SSP to play an announcement or to play an announcement and collect digits.

As shown in FIG. 2, the ISCP 40 is an integrated system. Among other system components, the ISCP 40 includes a Service Management System (SMS) 41, a Data and Reporting System (DRS) 45 and the actual data base or Service Control Point (SCP) 43. The ISCP also typically includes a terminal subsystem referred to as a Service Creation Environment or SCE (not shown) for programming the data base in the SCP 43 for the services subscribed to by each individual business customer. Although not shown in detail, the ISCP 50 will typically have a similar integrated system structure. Alternatively, the second ISCP 50 may not be an "integrated" system. For example, the second unit 50 may include only a data base system similar to that of the Service Control Point (SCP) 43.

For standard telephone service, each central office switching system normally responds to a service request on a local communication line connected thereto to selectively connect the requesting line to another selected local communication line. The connection can be made locally through only the connected central office switching system. For example, for a call from station A to station B, the SSP 11 provides the call connection without any connection to another central office. When the called line connects to a distant station, for example when station A calls station C, the connection is made through the connected central office switching system SSP 11 and at least one other central office switching system SSP 13 through the telephone trunks interconnection the two CO's.

In the normal call processing, the central office switching system responds to an off-hook and receives dialed digits from the calling station. The central office switching system analyzes the received digits to determine if the call is local or not. If the called station is local and the call can be completed through the one central office, the central office switching system connects the calling station to the called station. If, however, the called station is not local, the call must be completed through one or more distant central offices, and further processing is necessary. If at this point the call were connected serially through the trunks and appropriate central offices between the caller and the called party using in channel signalling, the trunks would be engaged before a determination is made that the called line is available or busy. Particularly if the called line is busy, this would unnecessarily tie up limited trunk capacity. The CCIS system through the STP's was developed to alleviate this problem.

In the CCIS type call processing method the local central office suspends the call and sends a query message through one or more of the STP's. The query message goes to the central office to which the called station is connected, referred to as the "terminating" central office; for example, the query would go from originating SSP 11 to terminating SSP 13. The terminating central office determines whether or not the called station is busy. If the called station is busy, the terminating central office so informs the originating central office which in turn provides a busy signal to the calling station. If the called station is not busy, the terminating central office so informs the originating central office. A telephone connection is then constructed via the trunks and central offices of the network between the calling and called stations. The receiving central office then provides a ringing signal to the called station and sends ringback tone back through the connection to the calling station.

The call processing routines discussed above are similar to those used in existing networks to complete calls between stations connected to land lines. In an AIN system implementing Personal Communication Service, these normal call processing routines would still be executed for completion of calls originating from stations not subscribing to the Personal Communication Service.

In one implementation, the local SSP type CO's are programmed to recognize any call directed to any one of the PCS subscribers associated therewith as a Personal Communication Service Call. In response to such a call destination type trigger, the CO associated with the destination subscriber, i.e the terminating SSP, would communicate with the ISCP via an STP to obtain all necessary call processing data to complete the PCS call to the subscriber's portable handset at its current location. It is also possible to program originating SSP's to determine whether or not outgoing calls are directed to PCS subscribers and trigger the communications with the ISCP at the originating SSP instead of the terminating SSP.

To extend special telephone services from the AIN to subscribers communicating via the mobile network will require adapting the MC's to trigger queries to the ISCP in response to outgoing call or service requests. One way to do this is to modify the switch structure and programming of the MC's so that each MC includes SSP functionality similar to that of the telephone network SSP's. Another approach is to modify the MC's to forward calls to an SSP capable switch or tandem, with outpulsing of the originating subscriber data, so as to process the calls via the tandem in manners similar to those used for non-SSP capable end offices switches discussed earlier.

PCS Handset

Although described principally as "handsets", the mobile communication units used in the Personal Communication Service ( PCS ) can take many forms. The mobile communication unit could take the form of a vehicle mounted unit similar to existing mobile telephones. Also, the mobile communication units might include other communication devices compatible with the system, with or without incorporating standard telephone communication components. For example, the portable unit may comprise portable facsimile devices, laptop computers etc., one or more of which might incorporate a telephone handset.

The mobile communication unit, particularly when in the form of a handset, is configured in manner similar to the cordless handsets found in the prior art, except that the PCS units include a radio transceivers operating at cellular frequencies and capable of meeting cellular signalling protocols. The compatibility with cellular systems allows the PCS mobile units to roam through existing cellular networks. A microprocessor in the mobile unit controls all operations of the unit, particularly registration procedures and associated signalling transmissions.

The PCS handset has the capability of interfacing with a base station, usually at the user's home, a local cellular system in which the user's home is located, additional cellular systems having access to the AIN, local microcell systems and any wireless Centrex/PBX to which the handset has been previously granted access. In order for the handset to gain access to the local cellular MC and microcell type PCS MC, both must be set up to transmit the same system ID (SID) and to indicate combined paging and access channels.

In order for the handset of the PCS to access its own base station as well as the macrocell MC and the microcell MC, the handset must operate at cellular frequencies. The scanning function of the handset is prioritized so as to register with its personal base station first. If the base station is not contacted the handset scans the macrocell and microcell control channels, selecting to register with the MC of the microcell system if detected before attempting to register with the MC of the macrocell system. If the handset has been granted access to a wireless Centrex system, it scans a set of control channels specially programmed into the handsets of Centrex members only. Selection of one of these special channels must be done by the specific action of the handset user, and additional handshake procedures may be carried out requiring a PIN number from the user before he is permitted to interface with the wireless Centrex.

Home Base Station

The home base station is structurally similar to prior art cordless telephone base stations, except that the transceiver in the base station operates at cellular frequencies and uses signalling protocols similar to those of the cellular network to perform registration procedures. Of particular note here, the base station includes a microprocessor for programmed control of base station operations. To perform registration with the ISCP, the base station also includes an auto dialer, and may include means to detect call progress tones and/or certain instruction signals from the telephone network.

Registration Process for the PCS Handset

Registration from a wireline phone can occur in two modes: automatic and manual. The automatic mode assumes that the personal user has a wireless set with a personal base station which can emulate the manual code described below (a "smartcard" or other type device could also be used for any CPE so equipped). The user dials a prearranged telephone number which is translated with a Destination Number (DN) trigger for AIN processing of the call. This trigger establishes a session between the user and the ISCP known as DTMF update. The ISCP instructs the network to play an announcement and collect digits. In a manual registration procedure, the announcement typically will be a synthesized speech prompt to enter digits. Several series of digits might be collected depending on the particular service (i.e., multiple personal numbers per handset). The user then disconnects after an acknowledgement from the ISCP.

In such registration call procedures, enough information is collected from the personal user to establish their identity-including a personal identification number (for a mobile set, this would be the serial number). The Automatic Number Identification (ANI) data identifies the station from which the subscriber placed the registration call. The ISCP "registers" or stores the station identification number and uses that number as a future destination number to route future calls. Also, the system will now trigger a response to calls from the station line and apply the registered subscriber's AIN features to calls from that line.

The first registration priority of the PCS handset is its home base station. Normally the handset operates at cellular frequencies in the 800 MHz range. The control channels used for registration on both the macro cell and micro cell systems are the same as those used in a normal cellular system. However, certain channels are dedicated specifically to the personal base station for "cordless" use. Under its control program, the microprocessor first causes the handset transceiver to scan channels dedicated to base station use. Thus, if the PCS handset is in range of its base unit, registration between the base unit and the handset will take place without any further operation to register with any other overlapping system. Every base station continuously transmits its identity in an overhead information on one of the channels dedicated to the cordless service. Every portable unit has been programmed with the type, number and location of the channels dedicated to personal base unit use in the present system. When the portable unit scans the dedicated "cordless" channels, a determination is made whether the identification number of the portable unit is being transmitted by its corresponding home base station. If so, registration between the portable unit and the base unit is carried out in a manner well known in cordless telephone technology. Thus, when the handset comes within range of its base station, it will detect its identification number and register with its home base station (see FIG. 3).

Figure 3:
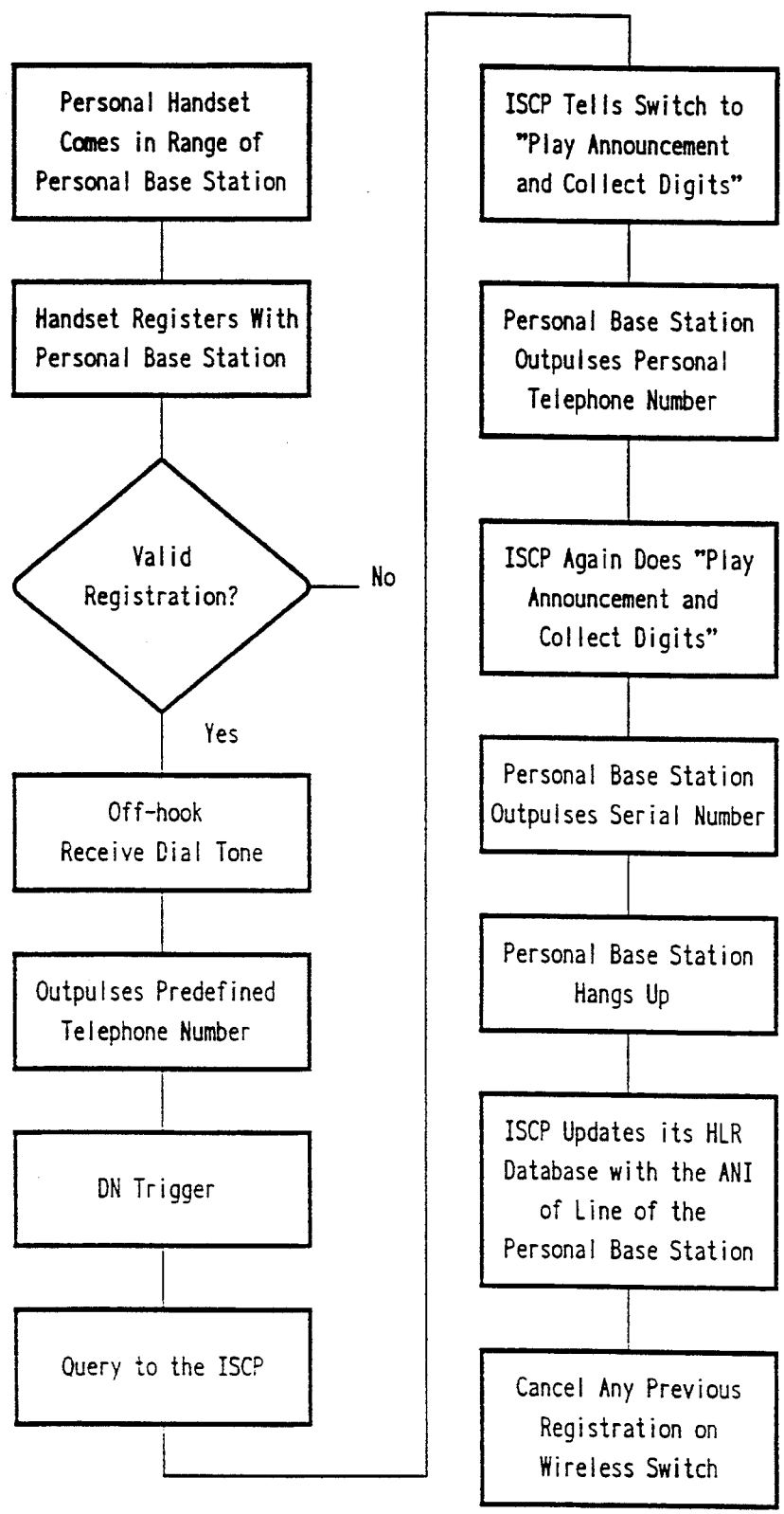
FIG. 3 is a flow chart showing the procedure by which the home base unit registers with the ISCP when the portable handset comes within range of the home base unit.

As illustrated in FIG. 3, after a validation of the handset, the microprocessor controlling the base station initiates an off-hook state in the telephone line connected to the base station. The microprocessor causes the normal DTMF generator of the base station to output a predetermined telephone number. This pre-programmed number is used to route a call to an SSP. A directory trigger associated with the SSP launches an enquiry to the appropriate ISCP. In response, the selected ISCP instructs the SSP to play an announcement to the base station and collect digits from the base station. In an automatic registration procedure of this type, the "announcement" is typically a tone signal, such as a second dial tone. The base station may include a tone detector or the microprocessor may wait a set period of time before proceeding. Either in response to detection of the announcement or after a set time, the base station outputs the personal telephone number or the mobile identification number of the user. The ISCP responds by instructing the SSP to again play an announcement to the base station and collect digits. Following the second announcement, the base station outputs a pre-programmed serial number. At this point, the connection is broken as an "on-hook" state is resumed at the base station.

In response to the serial number sent from the personal base station, the ISCP updates its home location register (HLR) for the identified subscriber with the appropriate location of the base station and an indication that the PCS handset is at that location. As a final task, the ISCP cancels any previous registration with other radio link controllers (such as cellular mobility controllers) that have been registered by the PCS handset.

The manual registration procedure performed manually by the user is essentially similar to the automatic operation shown in FIG. 3. For manual operation, however, all digits are input manually by keying a Touch Tone TM telephone, and the system provides the caller a series of voice prompts generated by the AIN containing the ISCP. The announcements sent to the base station can be generated from any number of different sources in the AIN other than the SSP. The advantage of the manual registration is that the user can register via any telephone line, and the system will route calls and provide the subscriber's special services to that line. The subscriber would then use the telephone set connected to the line instead of the PCS handset. This would still allow service, even in remote areas out of range of all wireless networks or when the mobile communication unit is out of service, for example because of a low battery or a breakdown of the mobile unit.

Once invoked, calls are delivered to the home/office wireline connection with the personal base station or other registered land line until the user's mobile communication unit registers on a wireless network, or until the user manually intervenes to route calls to an alternate destination. The home/office wireline connection can be an existing line or a new line. In the case of an existing line, distinctive ringing features may be added to differentiate calls to the PCS subscriber, or the existing number associated with that line can become the personal number for the PCS service.

An additional interactive data base can be provided so that a user of the base station can input the necessary information to register the base station and handset with the AIN, using a series of prompts from the interactive data base. The same method can be used for modifying a users personal services, adding additional levels of security (such as the requirement of an additional identification number) or updating telephone number lists for call-forwarding or voice mailbox purposes, as described in detail below.

FIG. 2 shows each of the personal base stations connected to a line going to an SSP. This need not always be the case, particularly for the above discussed registration procedure. If the base unit dials the number identifying an SSP for registration purposes, the SSP triggers AIN type processing upon detection of an incoming call directed to the registration telephone number, in a manner similar to the terminating trigger used for incoming PCS call processing. In response to such a call, the SSP would query the ISCP and go through the registration procedure exactly as described above, regardless of the line from which the call originated. This ability to connect the base to a line not necessarily connected to an SSP allows the subscriber to move the base unit and connect to virtually any telephone line. The subscriber simply disconnects the base from the home line and moves it to any other line at a location where the subscriber will be for some period of time. The base unit will still perform the automatic registration, and whenever the handset has registered with the base unit, the data stored in the ISCP will cause the system to route the subscriber's incoming calls to the new line.

Registration Process for Mobility Controllers

The PCS handset will attach themselves to a paging channel controlled by the cellular mobile controller only when not in range of the microcell mobile controller.

Thus, the registration process is prioritized so that the mobile PCS handset will register with the PCS microcell controller (PCS MC in FIG. 1) rather than with a cellular mobile controller in the same area. The mobility controller registration procedures are essentially similar for both cellular macrocell MC's and PCS microcell MC's. Mobile stations which are not part of the system of the present invention will normally register only with the cellular mobile controller.

The controller channel scanning procedures are specified in document EIA-553. There are three different types of control channel scans, the first two of which are associated with subscriber terminal initialization at power-on.

The first scan occurs immediately upon power-on and serves to determine the presence of cellular system radio coverage. The first scan involves a quick sampling of all 21 dedicated control channel (DCC) frequencies. If one or more signals are found, the mobile communication unit tunes to the strongest and receives an overhead message train (OMT). The OMT contains a variety of information about the system and is transmitted on every control channel roughly once each second. Among the information provided is the parameter "N", the number of paging channels provided in the system. This parameter is controlled by the system operator and in the present system is set to 12 on all control channels.

The second scan occurs immediately after the first. Its purpose is to identify and tune to the paging channel being transmitted by the cell with the best RF coverage at the mobile communication terminal's location.

The third scan occurs when the portable terminal seeks to access the system. This scan ensures that the access is via the best possible cell. Once the proper control channel is selected, the access proceeds as specified in the publication EIA-553. Initialization scans are repeated at each power-up, after each system access, whenever the selected paging channel no longer provides a usable signal, and every few minutes according to internal programming.

Figure 7:
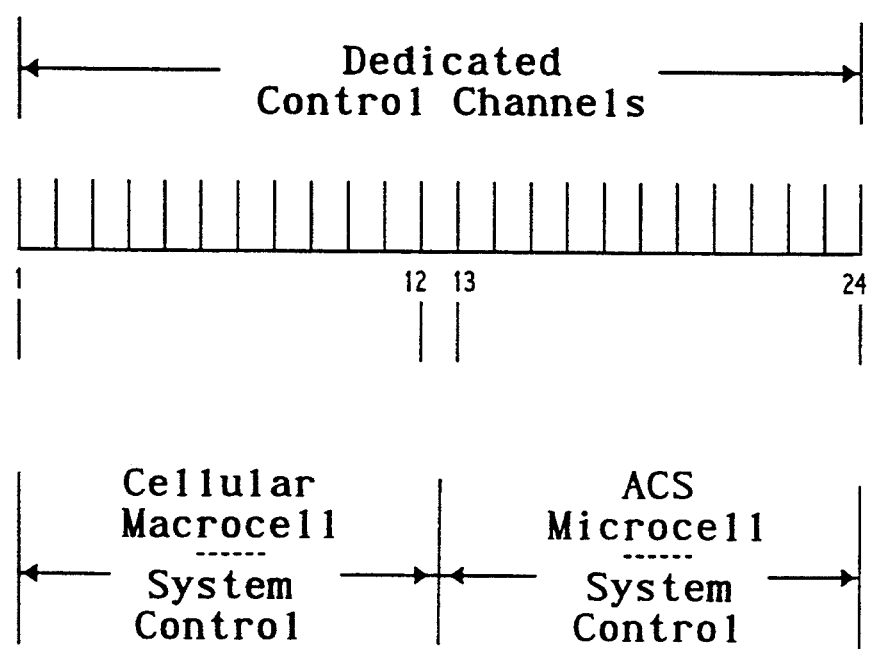
FIG. 7 is a diagram illustrating control-channel allocation used in the wireless portion of the network.

FIG. 7 illustrates dedicated control channel allocation. The first 12 channels are dedicated to a cellular controller associated with the system of the present invention but capable of handling mobile users which are not included in the present system. The second 12 cells are dedicated to the microcell controller that is limited only to PCS mobile users subscribing to the system of the present invention. A non-subscribing terminal would scan all the channels on the first scan. However, on the second scan only paging channels 1-12 would be checked and one of these selected. A mobile PCS user subscribing to the system would go through a first scan process identical to that of a non-subscriber; however, a second scan would be limited to only the last 12 control channels. If the PCS terminal is within range of a microcell controller, registration with that controller will take place. If the mobile user is not within range of the microcell controller no usable channel will be found in the range of control channels 13-24 and the portable terminal would revert to normal EIA-553 operation and scan the first 12 control channels.

Figure 4:
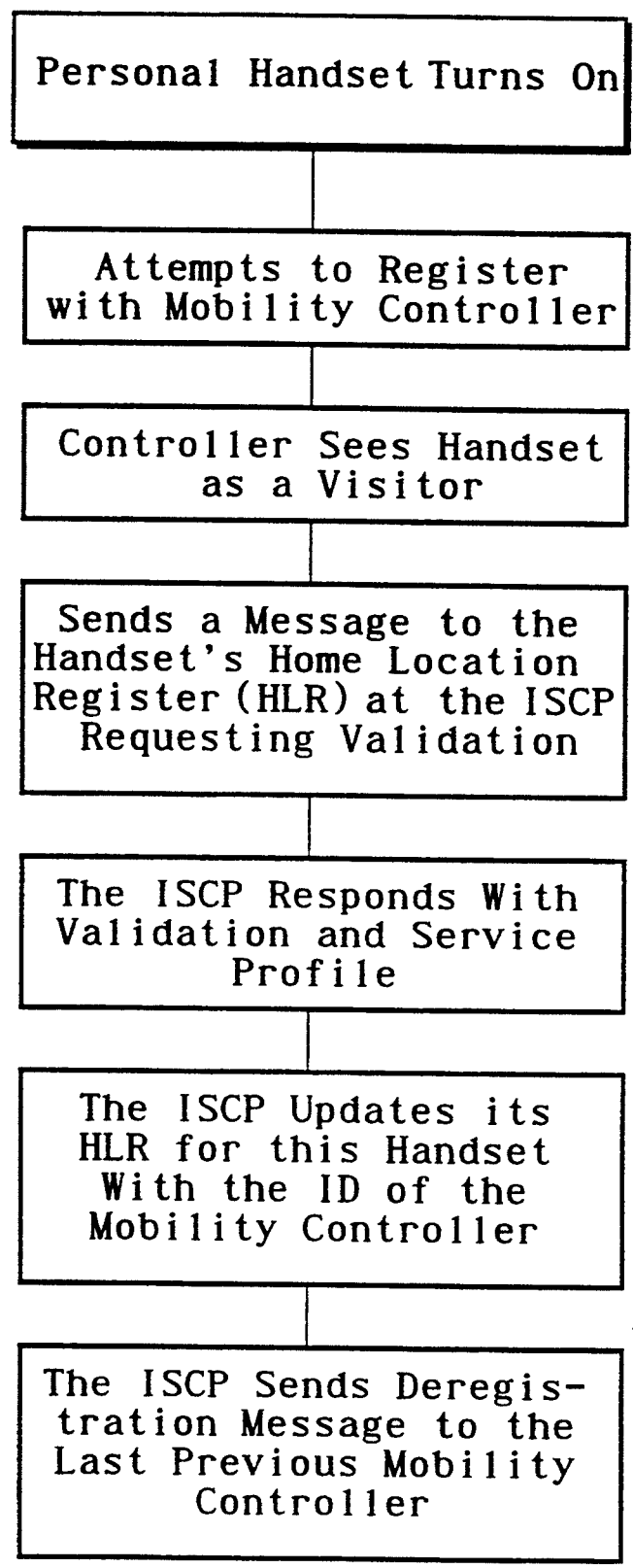
FIG. 4 is a flow chart illustrating the procedure by which a mobility controller registers with the ISCP when the portable handset comes within range of the mobility controller.

Once the PCS handset determines that it is not in range of the second 12 control channels of the microcell controller, scanning of the first 12 channels dedicated to a cellular system mobile controller is carried out, and the handset attempts to register with the mobile controller (MC) as indicated in the second block of FIG. 4. Registration between the handset and the mobile controller is conducted in a manner consistent with IS-41. However, there is one exception. The PCS subscriber is categorized in the visiting location register associated with the mobile controller as a visiting Cellular Subscriber Station (CCS). This is true even if the mobile controller is located so that it would normally be the "home" system of a mobile subscriber in that area.

As is standard in mobile controllers, when a station is registered in a visiting location register, the mobility controller attempts to obtain information regarding the visiting mobile station by accessing a home location register associated with that mobile station. In the present system, the HLR containing data regarding the PCS handset and its user is not associated with a mobility controller. Rather, the HLR for the mobile user is associated with an ISCP in the land line network.

Consequently, when the mobility controller in the area where the PCS handset is currently located attempts to gain information regarding that handset, the current mobility controller will have to access the ISCP associated with that handset. Thus, the current mobility controller sends an IS-41 message requesting validation to the HLR associated with the handset in the ISCP. The ISCP will respond very much in the same way that a mobility controller having a normal cellular subscriber's HLR would respond, by providing validation and service profile information. At this time, the ISCP will update the registration data portion of the HLR with identification data for the mobility controller, to indicate the current point at which the handset is registered. The ISCP also sends a deregistration message to the last known mobility controller in contact with the mobile station.

A correct ISCP can be accessed based upon the mobile identification number (MIN) automatically transmitted by the handset to the mobility controller when the handset enters the area of the controller using the previously described scanning and registration procedures. The handset MIN identifies the appropriate ISCP as the location of the handset HLR, a selected number of digits serving as an address for the ISCP. The MC can also be aided in locating the ISCP by referring to a data base to determine where the ISCP is located.

In sending validation information to the mobility controller, the ISCP will also download calling feature information associated with the PCS handset. Consequently, the mobility controller does not have to go through the additional sequence of tasks described in IS41.3-A, requiring that the mobility controller recognize a feature from the digits of the MIN and request information and validation from the HLR. In the present system, all the necessary information is downloaded with the original validation provided by the ISCP.

The validation procedure also serves to identify the mobility controller (MC) with which the PCS mobile communication unit has just registered. This MC identification is similar the visited MC identification provided to the MC holding the subscriber's HLR in a standard cellular network visiting subscriber registration and validation procedure. As a result, the location of a PCS handset can be known to its ISCP if the handset is in any area of a mobility controller adhering to IS-41 Rev. a.

As the PCS mobile user roams from the area of one MC to that of another, the ISCP can keep track of the user's location since automatic registration occurs each time the roaming mobile station enters the area of a new MC. Since the location of the roaming mobile user is always known in the ISCP, more efficient call routing can be performed, and a roaming user can always be reached by a party having access to the system of the present invention through a telephone network. Also, the mobile users do not have to make a call for a current MC to obtain registration of the PCS handset.

PCS Call Processing

Figure 5A:
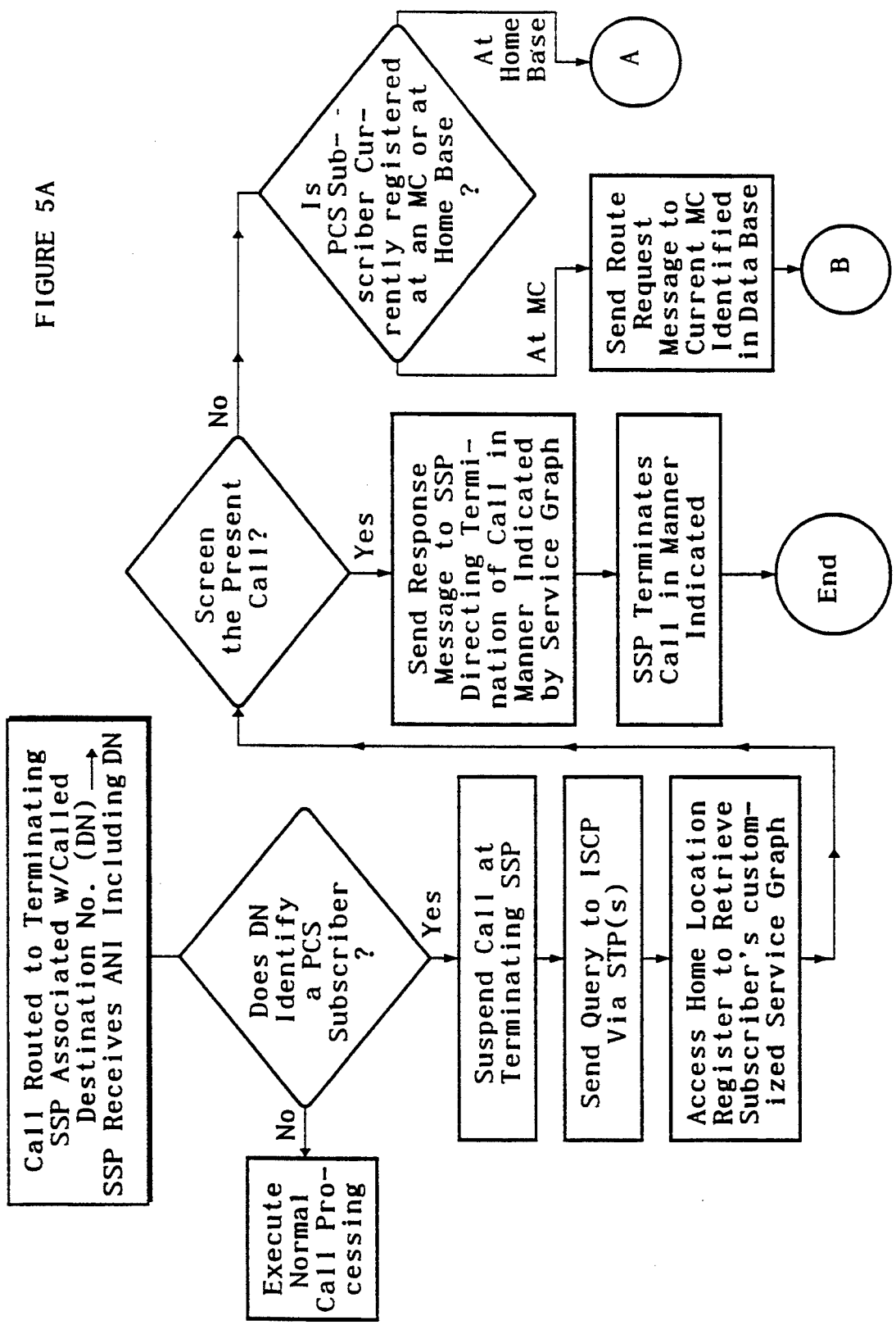
FIGS. 5A, 5B and 5C together form a flow chart depicting the call processing routine for routing calls to a Personal Communication Service subscriber.
Figure 5B:
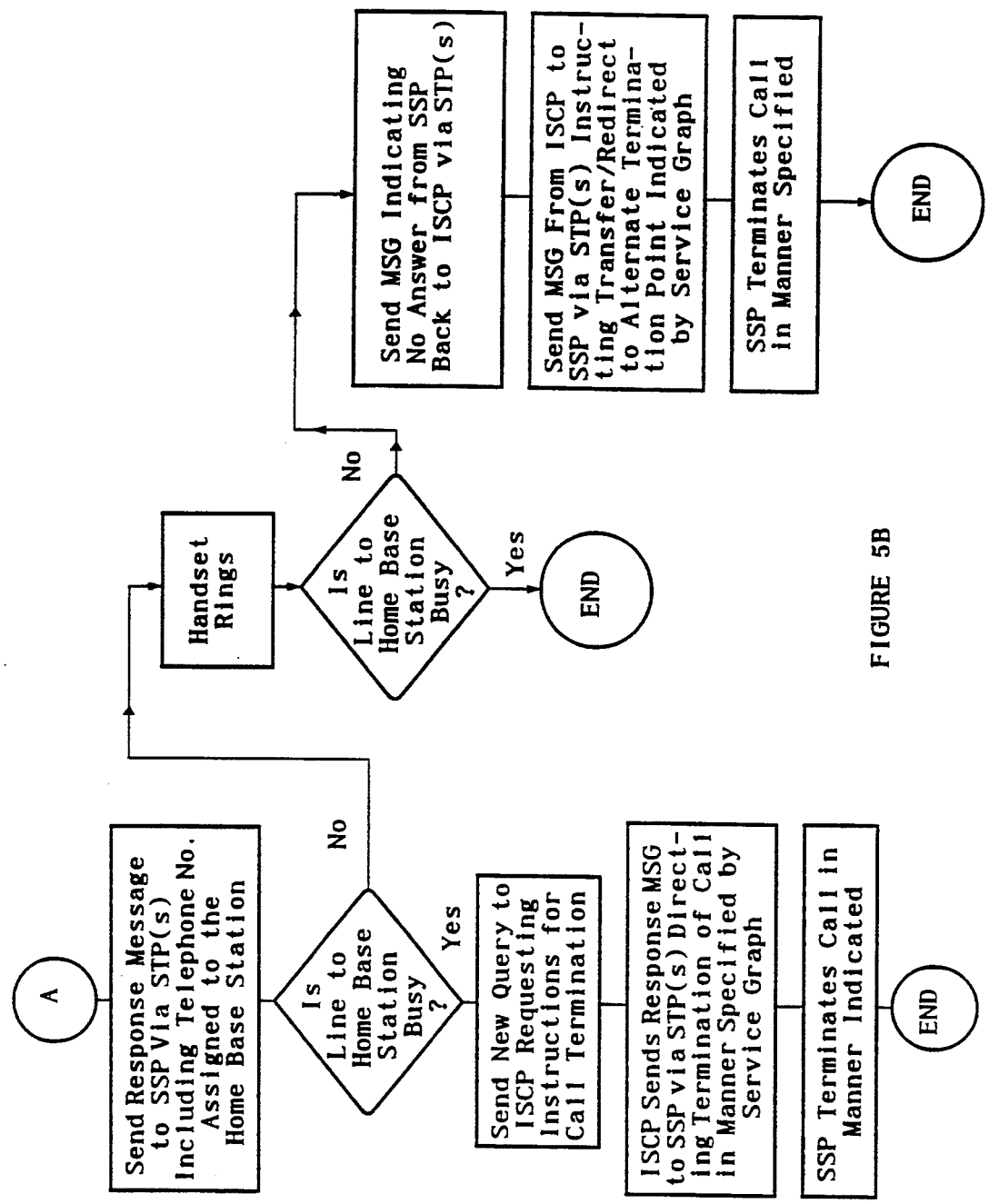
Figure 5C:
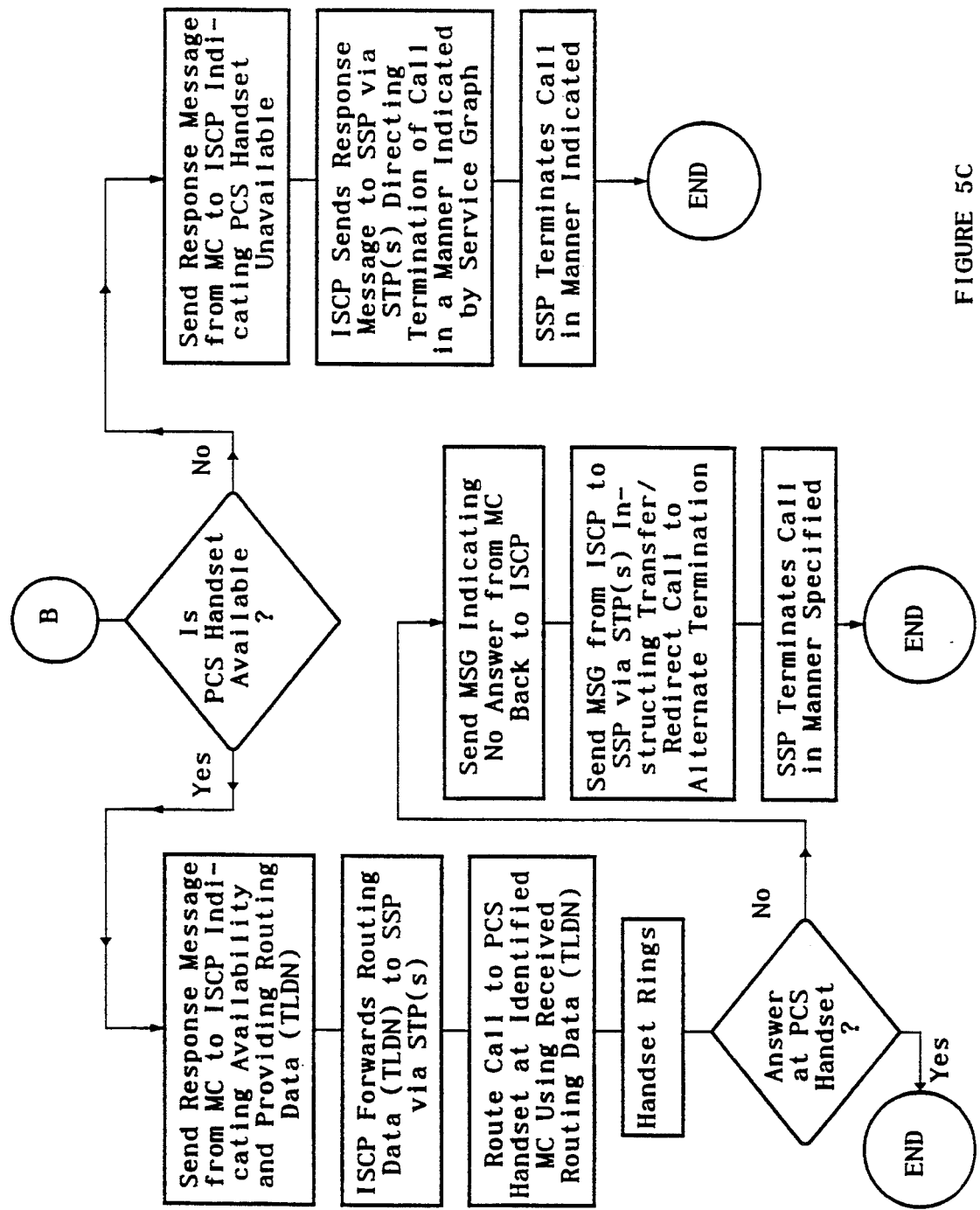

FIGS. 3 and 4 illustrate the procedures for providing current location registration data to the Home Location Register in the ISCP, as described in detail above. The Personal Communication Service system processes calls directed to the PCS subscriber's one assigned number by retrieving the most current registration data from the ISCP and using that data to route calls to the home base unit or an MC, whichever registered last. FIGS. 5A to 5C together show, in simplified form, the basic call processing involved in providing this "follow me" type Personal Communication Service.

For incoming PCS type calls, the AIN trigger used in PCS call processing is based on a recognition that the terminating station identified by the destination number is a PCS subscriber. At least initially, the central office SSP associated with the called PCS number will recognize this trigger. Other possible triggers and triggers at other points in the network will be discussed later.

With each call, a terminating SSP receives Automatic Number Identification data (ANI) which will include an identification of the calling subscriber and the destination number from its own call processing if the call originated within the same SSP or from a remote originating SSP. As illustrated in FIG. 5A, the terminating local SSP type CO analyzes the ANI information and determines if a call is directed to any one of the PCS subscribers associated therewith and thereby determines whether or not the current call is an PCS service type call. If not a PCS call, the SSP executes normal call processing as it would for any plain old telephone service call.

Now assume that, for example in the system of FIG. 2, John Doe is a PCS subscriber assigned PCS number 412-999-1234, and that John's home base is base station unit 16. Assume further that PCS subscriber John Doe's number is normally assigned to an SSP 17 in the Pittsburgh area, but the latest registration indicates availability through a cellular MC 22 in the Washington, D.C. area. A caller in Philadelphia dials the number for the 412-999-1234 on station C. The Philadelphia SSP 15 and the rest of the telephone network process the call as a standard land line telephone call until it reaches SSP 17 in the Pittsburgh area. The SSP 17, however, recognizes John Doe's DN 412-999-1234 as an indication of an AIN call.

In response to the call destination type trigger, the SSP type CO associated with the destination subscriber, i.e the terminating SSP, suspends call processing and sends a query to the ISCP. The query is in TCAP format and includes the ANI data which identifies both the originating subscriber and the destination number. In our specific example, the terminating SSP 17 in Pittsburgh suspends processing of the call to John Doe and sends a query identifying both the Philadelphia caller and John Doe to the ISCP 40 via STP's 25 and 31 and the interconnecting data links.

The ISCP uses the PCS number received with the query from the SSP to identify the subscriber's home location register (HLR). Typically, the PCS subscriber's home location file will provide a complete service graph (like a flow chart) to control further processing of the incoming call based on certain conditions of the current call. Each PCS subscriber has a corresponding service graph, and each subscriber can have their graph customized to suit their own business and/or life style. The ISCP looks at the ANI data and decides how to process the current call based on the subscriber's customized service graph.

Typically, this involves a first decision based on comparison of the ANI data to the service graph to decide whether or not to invoke a call screening feature, i.e. whether or not this PCS subscriber has requested screening and if so whether or not the subscriber's stored screening criteria mandate screening out the current call. The screening analysis can be based on the calling party's number, the time of day, the PCS subscriber's current location, combinations of these criteria, and/or any other arbitrary call related data the PCS subscriber might choose. For example, assume now that John Doe has selected to have calls screened between 5:00 PM and 8:30 AM weekdays and all day on weekends, unless his PCS handset is registered with the MC which provides the wireless Centrex service to his office. John's service graph indicates that during such times, the network should route the calls to his present location only if they originate from one of a specified number originating telephone station numbers specified in a first stored list.

For simplicity, FIG. 5 illustrates a screening scenario in which the result of the ANI based decision to screen this call involves termination of the call. Other screening scenarios are possible and will be discussed by way of example later. If the analysis of the call results in a decision to screen the call, the ISCP sends a response message to the SSP via the appropriate STP's and data links. The data message indicates the type of termination specified by the PCS subscriber's service graph data. The termination scenario can be as simple or as sophisticated as the PCS subscriber chooses. The service graph could call for routing to an announcement or a reorder signal (fast busy signal normally indicating network busy status), a voice mailbox system, etc. The service graph may call for different types of termination at different times, for different callers, or based on any other criteria arbitrarily selected by the subscriber. For example, John Doe's service graph data might direct the system to terminate calls from a second list of potential callers by routing them to a mail box, to terminate calls for the third list of callers at certain times (say 5:00 to 8:00 PM weekdays) to a third party's destination number (for example an Associate in California) and to terminate all other screened out calls to a reorder tone.

If the present call is not to be screened out, ISCP next examines the PCS subscriber's file in its data base to determine where the PCS subscriber is currently registered. If the user is registered in the mobile environment, i.e. at an identified MC, then the ISCP must obtain routing data from the Visiting Location Register (VLR) assigned to the subscriber's communication terminal in the identified MC, to determine a routing address or other condition. The ISCP therefore launches an IS-41 query addressed to the identified MC. This query goes through the SS#7 network to MC's such as shown in FIG. 2, which have SS#7 communication links with an STP and is received by the addressed MC. If the identified MC is an outside MC having X.25 communication only, the query goes through a hub STP, such as 53 in FIG. 2, and the X.25 network.

The MC then determines if the PCS handset is currently available (FIG. 5C). If so, the MC sends an IS-41 response message to the ISCP. This response message provides routing data for the PCS subscriber from the Visiting Location Register (VLR) currently assigned to that subscriber in the MC. This routing data, for example, includes the Temporary Local Directory Number (TLDN) which the MC has assigned to the visiting PCS subscriber.

The ISCP then formulates a TCAP response message based on the received routing data. In this TCAP message, the destination field would contain the assigned TLDN. The message is sent back to the terminating SSP office through the STP(s) and SS#7 data networks. The SSP then uses the routing data to route the call to the MC and forwards the TLDN to the MC to set up the wireless link to the PCS handset.

At this point the PCS handset in the MC controller's area rings. In our example, the Pittsburgh SSP 17 has routed the call through the voice trunk network and the Washington D.C. SSP 13 to the cellular MC 22. The MC 22 sends an addressed command signal to John's PCS handset, and the handset rings.

If the subscriber answers the handset, the call is completed. In an advanced system, with mid-call triggering and barge-in leg manipulation capabilities in the SSP, the MC's will also detect if the call is not answered at the handset, typically when ringing continues for more than a set number of rings. If the call is not answered, the MC sends an IS-41 format message indicating that condition back to the ISCP. The ISCP again accesses the PCS subscriber's file and sends a message to the SSP to transfer or redirect the call to an alternate termination point indicated in the subscriber's service graph. The SSP then terminates the call in the manner specified by the service graph. As in the screening routine, the subscriber can select any treatment of the unanswered call to suit his or her personal or business needs. The system can transfer the call to a voice mailbox service, to a third party line such as that of a secretary, to a reorder signal and so on. The choice of decision criteria and termination point can differ based on the particular caller as identified by the original AN I message, time of day, etc.

At the point where the ISCP queried the MC to determine if the PCS handset was available, the MC could alternately find that the handset is unavailable. There are several types of unavailability recognized by current cellular radio systems, such as busy and out of range (without yet registering with another MC). In any of those cases, the MC will detect unavailability and respond to the ISCP's routing request message by returning an appropriate IS-41 indication of unavailability of the particular PCS handset. The ISCP then sends a TCAP response message instructing the SSP how to terminate the call. Again, the subscriber can design the PCS service graph so that the system will select any desired termination for any of several different types of calls, e.g. to a mail box at certain times or to a reorder signal if called by certain parties, etc.

Going back to the determination of the PCS subscriber's current point of registration (FIG. 5A), at that point the ISCP may have determined that the subscriber was currently registered at the home base unit. In our example, assume that John Doe has returned home, his handset has already automatically registered the home base unit 16 in Pittsburgh, and the base called in and registered that fact with the ISCP 40, as described above with regard to FIG. 3. In this case (FIG. 5B), the ISCP sends a TCAP response message to the SSP, via the STP's and SS#7 data networks. The response message, however, now includes the complete actual telephone number assigned to the line connected to the base unit. The SSP determines whether or not the line is busy.

If the line is busy, the SSP sends a message so informing the ISCP and querying the ISCP for further instructions. The ISCP then sends a TCAP response message instructing the SSP how to terminate the call. Once more, the subscriber can design the PCS service graph so that the system will select any desired termination for any of several different types of calls, such as the mail box at certain times or to a reorder signal if called by certain parties, etc. The SSP will route and terminate the current call as specified by the PCS subscriber's service graph.

At the point in the call process where the SSP determined whether or not the line to the home base was busy, the SSP may have alternately found that the line was available. At this point the SSP provides a ringing signal on that line, and the base unit responds by sending a radio signal to the PCS handset instructing it to ring. At this point, the handset and any other telephones connected to the same line ring.

Again, if the subscriber answers the handset, the call is completed. In an advanced system where the SSP has mid-call triggering and barge-in leg manipulation capabilities, if the SSP detects that the call is not answered at the handset, typically when ringing continues for more than a set number of rings, the SSP sends a TCAP format message indicating that condition back to the ISCP. The ISCP again accesses the PCS subscriber's file and sends back a message instructing the SSP to transfer or redirect the call to an alternate termination point indicated in the subscriber's service graph. The SSP then terminates the call in the manner specified by the service graph. As in each of the earlier termination procedures, the subscriber can select any treatment of the unanswered call. The system can transfer the call to a voice mailbox service, to a third party line such as that of a secretary, to a reorder signal and so on. Again, the choice of termination can differ based on the particular caller as identified by the original ANI message, time of day, etc.

As shown in FIGS. 5A, 5B and 5C, the call to the PCS subscriber can reach a termination point, other than the handset, based on screening, unavailability/busy at either the MC or the base unit, or after a failure to answer at either the MC or the base unit. In the drawings these are all shown as different termination results, and if a particular subscriber chooses, each termination may direct calls to different termination points based on totally different criteria. In many cases, the subscriber might specify essentially the same criteria and points of termination for two or more of these possible terminations. For example, the unanswered calls might receive the same termination treatment, redirection to a secretary's line, for both the base unit location calls and the calls directed to the MC. There will be situations, however, where the subscriber may choose a different result based on the current point of registration. For example, if John Doe's PCS service was for business use, his service graph might specify redirect to his secretary's station when his handset is unavailable within the business's wireless Centrex area, but it could instruct termination with a reorder (fast busy) signal if the line to his base at his private home were busy.

In addition to screening and terminating calls, the service graph may suggest other processing scenarios, several of which might involve querying the caller. One example would provide a further level of screening. In such a scenario, if the ANI data indicates that the caller is a specific party or a member (or non-member) of a specified group, the ISCP sends an "INVOKE" message to the SSP. In response to such a message, the SSP plays an announcement, specified in the message, to the calling party and collects further digits. The digits could represent personal identification number type access control. In one preferred embodiment of such a scenario, if the caller is not a recognized party, the announcement asks the caller if he or she is willing to pay all charges for the call. If the PCS subscriber is currently registered via an MC, the announcement would ask if the caller is willing to pay for the air time necessary to complete the call via a wireless link. If the PCS subscriber is registered at point requiring long distance routing, or the subscriber's data calls for termination of the call at an alternate point requiring long distance routing, the announcement would ask if the caller is willing to pay all long distance toll charges for the call. The SSP collects digits and forwards them to the ISCP. The ISCP determines from the collected digits whether or not the caller accepts such charges and provides messages to the SSP's and/or MC's to instruct them to add charges for the air time or the long distance toll charges to the calling party's telephone bill.

As discussed above, the PCS call processing triggers at the terminating SSP upon recognition that the destination number identifies a PCS subscriber. Subsequent routing of the call to reach the subscriber's current registered location or a termination point specified in the subscriber's service graph may require routing through additional SSP's and trunk lines. This procedure is complicated and at times results in double switching through the SSP's and trunks. In the example where John Doe was in Washington but was assigned to a Pittsburgh SSP 17 (FIG. 2), suppose now that the incoming call originated from telephone C in the Washington area. The system would route the call from SSP 13 to the SSP 17 in Pittsburgh before triggering PCS processing, and the ISCP would then instruct the SSP 17 to reroute the call back to SSP 13 to MC 22 to reach John's mobile communication unit at its current point of registration. To improve routing efficiency and eliminate such double switching, the SSP's and MC's would be programmed to trigger AIN type query and response procedures on outgoing calls. Rather than provide translation tables in all SSP's and MC's, the originating SSP could launch a query to the ISCP to determine if a called party is a PCS subscriber for all calls. Alternatively, the originating SSP could process the call as a normal call to a remote SSP, using CCIS signalling to the terminating SSP. At the point were the terminating SSP determines availability of the called station, the terminating SSP would also determine if the called subscriber is a PCS subscriber. The response message sent back to the originating SSP would then tell that SSP to trigger AIN type processing and send an initial query up to the ISCP.

Outgoing Special Services

It is also possible to use the AIN network to provide special services to subscribers placing outgoing calls. This class of subscribers may include the PCS subscribers making calls through the land line network or the wireless network and other network subscribers. For example, the subscriber could be a member of a Centrex group (wired, wireless or both) having an extension dialing plan, or the AIN could provide an abbreviated dialing option to individual subscribers. In either example, the caller would dial a limited number of digits and the network would access data in the ISCP to determine the complete destination number. The subscriber files stored in the ISCP can be programmed to provide a wide variety of special service features on outgoing calls.

The personal user can activate features from either a mobile set using IS-41 type message to the ISCP (actually, the user dials prearranged digits, and the mobile switch sends out the IS-41 messages) or by using, again, DTMF update. Once again, the user would go through a scripted process to have specific features invoked or modified.

Figure 6:
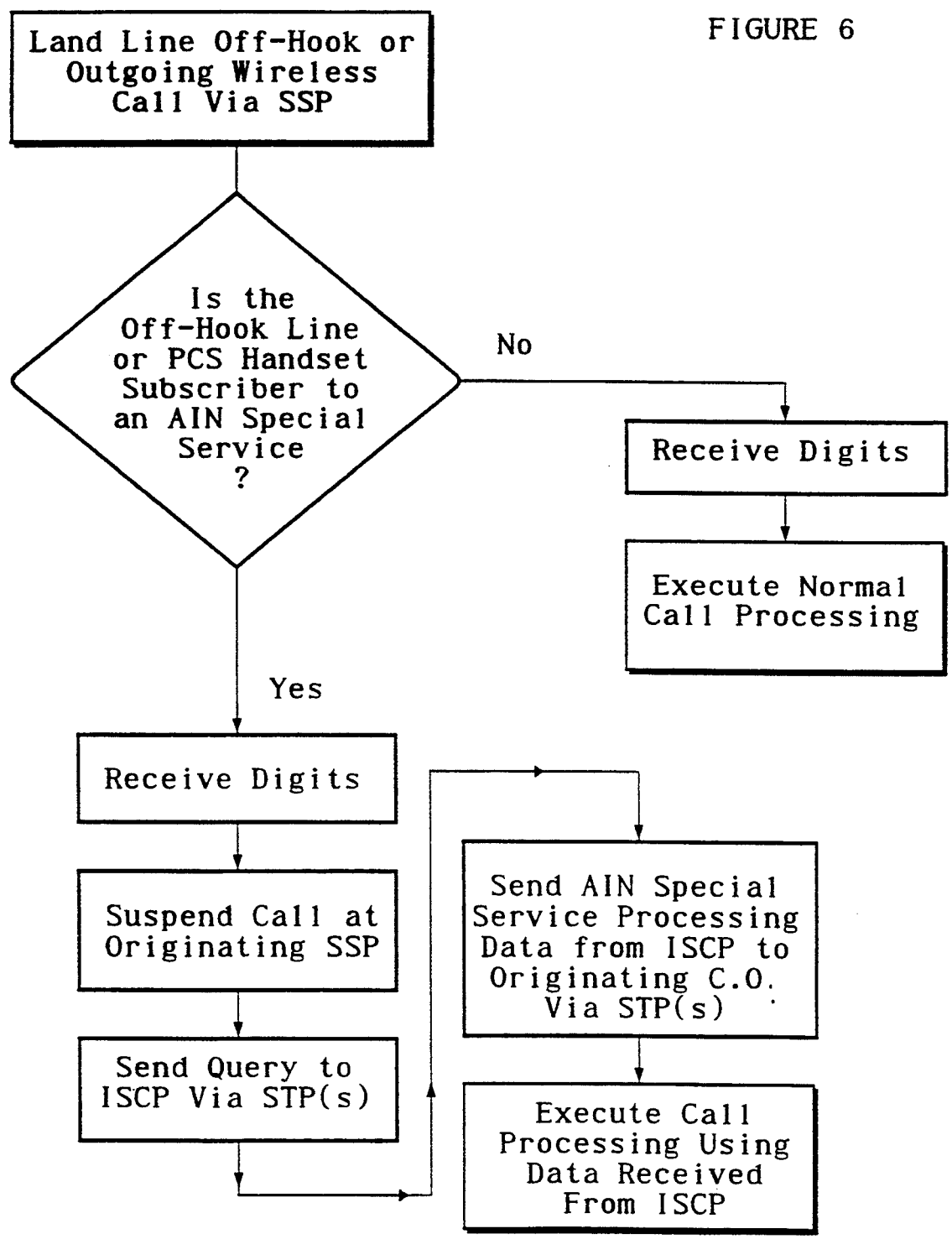
FIG. 6 is a flow chart depicting call processing for providing special communication services in the intelligent network.

To implement AIN special services in the seamless network, the MC's could be modified to act as SSP's, for example to trigger queries to the ISCP in response to outgoing call or service requests. At least initially, the MC's will be modified only to forward calls to an SSP capable switch or tandem acting as the originating central office within the PSTN, and the MC would outpulse ANI data including the originating subscriber data. The originating SSP will then trigger AIN processing, based on the calling subscriber's identification, just as if the call initiated from a land line. FIG. 6 shows, in simplified form, one procedure for providing the added AIN special services to the calling subscriber.

With reference to FIG. 6, after the SSP detects an off-hook or an outgoing call from a wireless subscriber, it must initially determine whether or not the call originates from a line or PCS handset of a party subscribing to an AIN special Service. In the simplest land line case, this means checking a translation table in the SSP central office to determine if the line or handset requesting service is an AIN subscriber line or handset. If not an AIN subscriber, the system receives dialed digits from the land line or destination digits from the handset and MC and executes normal call processing routines for completing the call.

If the call originates from an AIN special service subscriber's line or handset, the originating SSP receives dialed digits from the land line or destination digits from the handset and MC. The SSP then suspends the call and sends a query message up to the ISCP. This query message is in the TCAP format for an initial query from an SSP. Specifically, the office sends the TCAP query via a CCIS link to an STP, the STP recognizes that the query is addressed to the ISCP and retransmits the query, either directly or through a further STP, as in FIG. 2, to the ISCP.

The ISCP uses the originating party identification included in the initial query type TCAP message to identify the particular subscriber. The dialed digits and/or calling number are then used to identify processing data needed to provide the requested AIN special service from a stored data table associated with the particular subscriber. The ISCP then formulates an appropriate response message, again in the format specified by TCAP, and transmits the response message back to the originating SSP via STP(s) and SS#7 links.

The SSP then provides the requested service based on the received processing data. In the simple example of an extension or abbreviated dialing plan, the dialed digits might represent a minimum number of digits of the called station's number. The response message would then provide the complete number of the called station, and the system executes normal call processing routines for completing the call using the complete telephone number received from the ISCP. If the complete number identifies a PCS destination subscriber, when the call reaches the terminating SSP associated with that destination, that terminating SSP will execute PCS routing of the call in exactly the manner discussed above with regard to FIGS. 5A, 5B and 5C.

Although the various AIN query and response sequences have each been described above as a single query and response message, the SSP type central office and MC's may send and receive messages back and forth with the ISCP several times. For example, if the data stored in the ISCP indicates additional data is needed, the first message back to the office or MC might instruct that office to generate a prompt (speech or tone) requesting that the originating subscriber dial in additional digits. This might be the case if the stored data indicated some level of access control or restriction relating to the requested service, in which case the additional dialed digits might represent a personal identification number. One special case for this would be requesting that the caller accept charges for air time on the wireless network against the caller's bill. The central office would then transmit the additional data to the ISCP for further processing, e.g. comparison against stored data or modification of billing procedure (which may include appropriate notice to the MC of the called PCS subscriber).

Communications Between ISCP's

In the above discussions of PCS call processing and provision of AIN special services, the queries and responses all were with a single ISCP. As shown in FIG. 2, however, there will typically be more than one ISCP, each serving a different geographic region. The regions might correspond to LATA's, to the areas serviced by separate TELCO's or some other arbitrary division dictated by the messaging capacity of the data links, etc.

The programming and call processing routines within an ISCP will be compatible with the call processing capabilities of the SSP's and MC's within that same area. The programming in other ISCP's however, may not be completely compatible. Therefore, transmission of call processing data from an ISCP in one region to an SSP or MC in another area might cause all or part of the network in the other area to crash. In such cases it is preferred that the SSP's and MC's within a given region communicate directly with only the ISCP within that region, and some form of mediation between the remote ISCP and the SSP's and MC's in the local region becomes mandatory. The present invention provides this mediation at the ISCP level.

It would be possible to recreate each PCS subscriber's service graph data in each ISCP, but such a solution would be expensive and cumbersome. For example, each time a subscriber modified her service graph, the TELCO's would have to reprogram each and every ISCP in the same manner. The invention therefore designates the ISCP in the subscriber's home region as the source of that subscriber's Home Location Register (HLR) data, including current registered location, special service data, PCS service graph, validation information, etc. Also, each of the ISCP's are set up to include Visiting Location Register (VLR) capability. When a subscriber traveling in a region other than her home region registers with an ISCP outside her home region, through either a manual or automatic telephone registration procedure or through an MC registration procedure as in FIG. 4, that ISCP establishes a VLR for that visiting subscriber.

When the ISCP sets up the VLR, it identifies the ISCP holding that subscriber's HLR data based on the PCS handset's unique identification number. The ISCP in the visited region then initiates a validation procedure with the home region ISCP, via the packet switched signalling network and STP(s), in a manner similar to the validation procedure executed when the subscriber registers with one of the MC's. In particular, in response to a query from the ISCP in the visited area, the home region ISCP retrieves the subscriber's HLR file and forwards that file data back to the ISCP in the visited region.

With reference to the system shown in FIG. 2, consider again the example where PCS subscriber John Doe is assigned PCS number 412-999-1234, which is normally assigned to an SSP 17 in the Pittsburgh area. The SSP 17 sends and receives all of its call processing queries regarding John Doe's services to and from the first ISCP 40. Now John takes his handset and travels to California. When John registers on a line or his handset registers through an MC such as MC 34 in California, the registration is directed to an ISCP 50 in California. The California ISCP 50 queries the Pittsburgh ISCP 40 to obtain John's service graph and any other data necessary to valid John's PCS handset as a visiting station, and stores the service graph data in a VLR now assigned to John Doe.

This validation procedure also serves to register the visited area ISCP as if that ISCP were the point where the handset can be reached, in a manner similar to the registration of an MC. Subsequently, when a PCS call comes in directed to the visiting subscriber and the home area the SSP, that SSP queries the home region ISCP in the normal manner. The home region ISCP queries the visited area ISCP to determine availability and obtain a Temporary Location Destination Number for the subscriber, in a manner similar to the routing request directed to an MC. The visited region ISCP performs any data communication with the SSP's or MC's in its regions to obtain the necessary to availability and routing information and returns that data to the home region ISCP. The home region ISCP forwards the routing information to the home normal terminating SSP which uses that information to route the call to the visited region.

The TLDN is associated with one of the SSP's in the visited region, just as the PCS subscriber's normal PCS number is assigned to a terminating SSP in the home region. When the call reaches the terminating SSP corresponding to the TLDN, that SSP recognizes the TLDN included in the ANI for the call and processes the call as a normal PCS call, but with its call processing control messages going to and from only the ISCP in the visited region. The terminating TLDN includes the TLDN in the initial TCAP response message as the destination number, and the ISCP uses that number to retrieve appropriate subscriber service graph data and current registration from the VLR.

In our example, the California ISCP 50 has registered with the ISCP 40 and received John Doe's service graph data. When a call directed to John Doe reaches his normally assigned SSP 17 in Pittsburgh, assuming the service graph indicates the current call should go through and the PCS handset is not unavailable, the ISCP 40 instructs the SSP 17 to route the call to the TLDN associated with the SSP 19 in California. The SSP 19 responds to the incoming call and initiates the PCS processing routine with access to the VLR data in the California ISCP 50. The ISCP 50 determines the current point of registration of John Doe's handset, for example the MC 32, and proceeds with processing of the PCS call in the normal manner. As needed, the ISCP 50 will at various points in the process communicate with the MC 34 in that region. As seen from this specific example, the ISCP's communicated with each other, but the MC's and SSP's in each region communicated only with the ISCP in the same region.

When the visiting PCS subscriber requests an AIN special service, the SSP's and MC's send and receive all queries and response messages to and from the ISCP in the visited region. All service graph data is retrieved from the VLR, without any further reference to the home region ISCP.

In processing all calls to and from the visiting subscriber, the ISCP in the visited region examines the call processing data called for by the data in the VLR and modifies or filters out any instructions which would be incompatible with the SSP's and MC/s of that region. This mediation by the ISCP in the same region as the SSP's and MC's it communicates with prevents incompatible instructions from reaching the SSP's and MC's.

This feature, although described in relation to an integrated wire line and wireless network, actually has broader applications. In particular, since the subscriber can register by automatic dialing or manually over a land line, it is possible to provide the PCS call direction and associated special services, to any land line the subscriber chooses to use. Although the mobile communications provided by the wireless handset are advantageous they are not always necessary. The system could provide a follow me type service without the wireless handset. In such a system, the communications between ISCP's in different regions would still be necessary and the system could still operate exactly as described above. Also, if a national data base were established, that data base would contain all HLR data. The ISCP's in the different regions would treat all subscribers as visitors, assign a VLR and obtain necessary data from the national data base, in a manner similar to that described above for communications between two ISCP's. The national data base could be used if all persons were assigned a unique personal telephone number.

As in the basic PCS call processing routine (FIGS. 5A–5C), the above discussion of PCS routing using two communicating ISCP's assumes triggering will occur at the home terminating SSP upon recognition that the destination number identifies a PCS subscriber. Preferred embodiments of the system however, will be programmed to use outgoing PCS call triggering, to improve routing efficiency and eliminate such double switching.

Service Creation/Modification

A key advantage of the present system is the ability to write and modify the customer's service graph for PCS calls and special services at any time to suit the subscriber's current desires. In an initial implementation, the changes in the data base will probably be made manually by a telephone company technician. Specifically, a technician operating the ISCP would establish or enter changes in the subscriber's data files. The customer would ask the telephone operating company for a change, and the operating company would issue a service order to the technician for each change. The technician would then use the SCE terminal to actually enter the changes into the data base, and the telephone company would bill the subscriber for the change.

Subscribers, however, are increasingly asking for control over their own communication services. The present invention will provide such control by allowing the subscriber one of several forms of access to their data files in the ISCP. A preferred implementation of such an access feature would use an interactive voice and DTMF input type access procedure similar to the manual procedure for registration via a land line. The subscriber would dial a specified number to initiate programming. The call could be routed through the network to an appropriate automated voice response system coupled to the ISCP. Alternatively, the SSP connected to the line could respond to instructions from the ISCP to provide voice messages from an associated peripheral announcement system and forward dialed digits and ANI data to the ISCP as TCAP messages. In either case, if the subscriber calls from that subscriber's own line, for example from the line assigned to the subscriber's home base unit, the ANI information for the call serves to identify the subscriber. Alternately, the subscriber could enter an identification number. The ISCP would receive and use the ANI or dialed DTMF identification number to identify the subscriber's data files. The ISCP, however, would grant access only to the identified subscriber's files.

The voice response system would provide synthesized speech prompts and accept DTMF inputs to allow individual subscribers to enter their own changes in their data files in the ISCP. This interactive voice response type system would prompt the caller with messages directing the caller to select items form a menu of possible entries or changes in the subscriber's service graph. The menu items would only include entries which were compatible with the AIN system processing procedures, and entries would be stored in the data file only after they are determined to be complete and system compatible.

For a more sophisticated customer, access might be provided via a Personal Computer, a data terminal or some other form of work station. Such a subscriber would call in and establish a data link to the ICSP via modems. The subscriber could call using a wireless mobile communications unit or a standard land line. Security is controlled through the terminal and/or the line from which the terminal calls in to the ISCP. The terminal may have a built in security code which the ISCP verifies before granting access to the data base, or the ISCP may check the originating telephone number and the terminal identity number against a stored number from which that terminal is expected to call. Once access was granted, however, the terminal would still only have access to an individual subscriber's files or the files of employees of a business subscriber. Other subscriber's files, and the programming which controls system operation, would not be available through such terminal access. As in the DTMF access system, the terminal access procedure would limit the subscriber's entries to complete entries which were compatible with the AIN system operating parameters. Alternatively, the terminal or workstation could be owned and operated by a wireless communication service provider. The service provider would sell actual PCS services to individual subscribers, and the terminal would be used to customize new services or enter service changes on behalf of individual PCS subscribers.

The ISCP includes a validation system, which is an expert system prevents incompatible entries. For example, the validation system prevents entry of service changes which would create infinite loops that would cause the switch to malfunction. The validation system would control entry of new services and changes in service for each type of subscriber access to the ISCP data files.

Other Features

Because of the ease of programming the subscriber's data files within the ISCP, the present system can readily adapt to providing the subscriber with a wide variety of special features. A number of the features can be outgoing features processed as discussed in the AIN Special Services section above. Copending commonly assigned application Ser. No. 07/843,06 entitled "Area Wide Centrex", for example, discloses a variety of services for business customers which could easily be added to the present system. The ISCP can also provide a variety of reporting services, for example station message detail reports customized for each subscriber or each station assigned to a particular subscriber. Furthermore, since the system registers a current location of each PCS portable unit, the system can report a subscriber's location at any given time.

It would also be a simple matter to program the home base unit and ISCP to provide further enhancements. For example, since the ISCP knows if it routes a call to a voice mailbox, it can store that data. Then when the home base unit executes a registration call, the ISCP could send an instruction to the base unit to ring the PCS handset and another message to connect the subscriber's home line to the line of the voice mailbox. The subscriber would then know that messages are waiting and retrieve those messages.

Because of the location registration, it also would be possible to store and analyze customer movements. This could be used to detect patterns and provide customized information services based on those patterns. For example, if the subscriber takes the same route to work every morning, the stored data would indicate a pattern of registration with MC's along that route. The system then might provide a voice message to the PCS handset every morning, for example explaining current traffic conditions along the route of travel.

In an advanced service, the PCS call might ring at both the wireless handset and the home or office telephone, e.g., on the line to the personal base station. The system would then provide an intercom link or three way conference with the handset and the home or office telephone.

CONCLUSION

From the above detailed description it should be clear that the present integrated network provides centralized control of call processing by both central office switching systems and wireless mobility controllers to establish a completed communication link between one of the communication lines and one of the mobile communication units, based on the stored call processing data associated with individual subscribers. This call processing control can provide call routing to either a land line or a wireless unit via a mobility controller in response to calls directed to a single number. The system can also extend special services normally provided to land lines by the telephone central office switches to any line of the system designated by subscriber registration and to mobile units operating in the wireless portion of the network.

What is claimed is:

1. An integrated wired and wireless communication network, comprising:
   a central office switching system connected to the communication lines including at least one service switching point for selectively providing switched communications between the communication lines;
   a mobility controller, connected to the central office switching system, arranged for selectively providing wireless communications between said central office switching system and wireless mobile communication units by using control data conveyed to at least one service switching point through a service transfer point; and
   a network controller arranged for selectively providing control data to effect land line communications, and arranged separately from the central office switching system and the mobility controller, said network controller being connected to both said mobility controller and said at least one service switching point through at least one service transfer point arranged to convey control data to effect communications, said network controller storing preprogrammed call processing data associated with subscribers who are associated with one of the communication lines connected to the central office switching system and said network controller further storing preprogrammed call processing data associated with subscribers who are associated with one of the mobile communication units;
   wherein call processing by both the central office switching system and the mobility controller to establish a completed communication link between one of the communication lines and one of the mobile communication units is controlled in response to the stored preprogrammed call processing data associated with at least one of the subscribers and transmitted through said service transfer point.

2. An integrated wired and wireless communication network as in claim 1, wherein the communication lines are telephone lines and the central office switching system comprises a telephone central office switch.

3. An integrated wired and wireless communication network as in claim 1, wherein the mobility controller comprises a cellular radio telephone system communications controller, and the portable communications units are cellular telephone stations.

4. An integrated wired and wireless communication network, comprising:

a central office switching system connected to the communication lines including at least one service switching point for selectively providing switched communications between the communication lines;

a mobility controller, connected to the central office switching system, for selectively providing wireless communications between said central office switching system and wireless mobile communication units; and a network controller, separate from the central office switching system and the mobility controller, said network controller being connected to both said mobility controller and said at least one service switching point through at least one service transfer point, said network controller storing preprogrammed call processing data associated with subscribers who are associated with one of the communication lines connected to the central office switching system and storing preprogrammed call processing data associated with subscribers who each are associated with one of the mobile communication units;

wherein call processing by both the central office switching system and the mobility controller to establish a completed communication link between one of the communication lines and one of the mobile communication units is controlled in response to the stored preprogrammed call processing data associated with at least one of the subscribers and, a subscriber having one of the mobile communication units is also assigned one of the communication lines, and the preprogrammed call processing data associated with that subscriber stored in the network controller indicates whether that subscriber is currently registered for communication via the assigned line or the mobile controller and mobile communications unit.

5. An integrated wired and wireless communication network as in claim 4, wherein the central office switching system selectively routes a call directed to a single number assigned to said subscriber to the communication line assigned to said subscriber or to the mobility controller and mobile communication unit, whichever is indicated by the current registration data for the subscriber.

6. An integrated wired and wireless communication network as in claim 4, wherein all messages communicated between the network controller and the central office switching system are in Transaction Capabilities Applications Protocol (TCAP) format.

7. An integrated wired and wireless communication network as in claim 4, wherein all messages communicated between the network controller and the mobility controller are in IS-41 format.

8. An integrated wired and wireless communication network as in claim 4, further comprising a signalling communication system for two-way communications of data messages between the central office switching system and the network controller and for two-way communications of data messages between the mobility controller and the central data base.

9. An integrated wired and wireless communication network as in claim 8, wherein the signalling communication system includes SS#7 communication links for two-way communications of data messages between the central office switching system and the network controller.

10. An integrated wired and wireless communication network as in claim 8, wherein the signalling communication system includes SS#7 communication links for two-way communications of data messages between the mobility controller and the network controller.

11. An integrated wired and wireless communication network as in claim 4, further comprising means for providing two-way communications of data messages between the network controller and at least one mobility controller outside of the system via an X.25 packet network.

12. An integrated wired and wireless communication network as in claim 5, further comprising access means for adding or modifying call processing data associated with an individual subscriber stored in the network controller.

13. An integrated wired and wireless communication network as in claim 12, wherein said access means comprises means for receiving dual tone multifrequency signals over a telephone line indicative of dialed data input by a caller, and means for transmitting prompt signals to the caller over the telephone line.

14. An integrated wired and wireless communication network as in claim 13, wherein the means for receiving dual tone multifrequency signals comprises an element of the central office switching system.

15. An integrated wired and wireless communication network as in claim 13, wherein the means for transmitting prompt signals comprises means for synthesizing voice prompt messages.

16. An integrated wired and wireless communication network as in claim 12, wherein said access means comprises a work station for transmitting digital data to the network controller.

17. In an integrated wired and wireless communication network, comprising communication lines, a central office switching system connected to the communication lines including at least one service switching point for selectively providing switched communication connections, a mobility controller arranged for selectively providing wireless communications between the central office switching system and wireless mobile communication units using control data conveyed to at least one service switching point through a service transfer point, and a network controller arranged to selectively provide control data to effect landline communications, and arranged separately from the central office switching system and the mobility controller, said network controller being connected to both said mobility controller and said at least one service switching point through at least one service transfer point arranged to convey control data to effect communications, a method of selectively routing calls to a subscriber on a communication line and to a mobile communication unit assigned to the subscriber via the mobility controller using a single number assigned to identify the subscriber, said method comprising the steps of:

storing data in the network controller to indicate whether the subscriber is currently registered for communication via a specified communication line or via the mobility controller;

in response to a call directed to the number assigned to identify the subscriber, accessing the registration data in the network controller; and communicating said registration data from said network controller through said at least one service transfer point to selectively route the call to the subscriber's current location via the specified communication line and/or the mobility controller, as indicated by the current data.

18. In an integrated wired and wireless communication network, comprising communication lines, a central office switching system connected to the communication lines including at least one service switching point for selectively providing switched communication connections, a mobility controller for selectively providing wireless communications between the central office switching system and wireless mobile communication units, and a network controller, separate from the central office switching system and the mobility controller, said network controller being connected to both said mobility controller and said at least one service switching point through at least one service transfer point, a method of selectively routing calls to a subscriber on a communication line and to a mobile communication unit assigned to the subscriber via the mobility controller using a single number assigned to identify the subscriber, said method comprising the steps of:

storing data in the network controller to indicate whether the subscriber is currently registered for communication via a specified communication line or via the mobility controller;

in response to a call directed to the number assigned to identify the subscriber, accessing the registration data in the network controller;

communicating said data from said network controller through said at least one service transfer point to selectively route the call to the subscriber's current location via the specified communication line and/or the mobility controller, as indicated by the current registration data;

when the subscriber is currently registered for communication via the mobility controller, sending a routing request from the network controller to the mobility controller;

in response to the routing request, sending a message to the network controller indicating a routing number which the mobility controller has assigned to the subscriber's mobile communication unit;

forwarding the routing number from the network controller to the central office switching system; and using the routing number to route the call from the central office switching system, through the mobility controller to the subscriber's mobile communication unit.

19. A method as in claim 18, further comprising the steps of:

detecting that there has been no answer of the call at the subscriber's mobile communication unit;

sending a message to the network controller indicating the no answer detection;

accessing transfer data stored in the network controller which is associated with the subscriber to determine how the subscriber has selected to terminate calls when unanswered; and terminating the call in accord with the accessed transfer data.

20. A method as in claim 18, further comprising the steps of:

when the subscriber is currently registered for communication via the mobility controller, sending a routing request from the network controller to the mobility controller;

in response to the routing request, detecting that the subscriber's mobile communication unit is currently unavailable and sending a message to the network controller indicating unavailability;

accessing termination data stored in the network controller which is associated with the subscriber to determine how the subscriber has selected to terminate calls when unavailable; and terminating the call in accord with the accessed termination data.

21. A method as in claim 18, the method further comprising the steps of:

sending a message from the network controller to the central office switching system instructing the central office switching system to send an announcement to the caller and collect more digits;

if the digits meet certain criteria specified by data associated with the subscriber stored in the network controller, routing the call to the subscriber's location; and if the digits do not meet the certain criteria, routing the call to an alternate termination point specified by data associated with the subscriber stored in the network controller.

22. A method as in claim 21, wherein if data stored in the network controller indicates that the call directed to the subscriber should be routed in some manner which would incur a charge, the announcement asks the caller whether or not the caller is willing to pay the charge, and the call is routed as indicated by the stored data only if the collected digits indicate that the caller assents to payment of the toll charge.

23. A method as in claim 22, wherein when the subscriber is currently registered for communication via the mobility controller, the announcement asks the caller whether or not the caller is willing to pay for air time necessary to complete the call to the mobile communication unit via the mobility controller.

24. A method as in claim 22, wherein when the subscriber is currently registered for communication via the specified communication line and reaching the specified line will require routing via a long distance line, the announcement asks the caller whether or not the caller is willing to pay for use of the long distance line.

25. A method as in claim 22, wherein when data stored in the network controller indicates that the call should be routed to an alternate point which would require routing via a long distance line, the announcement asks the caller whether or not the caller is willing to pay for use of the long distance line.

26. A method as in claim 18, further comprising the steps of:

when the subscriber is currently registered for communication via a specified communication line, and the call has been routed to the subscriber's specified communication line detecting that there has been no answer of the call on the subscriber's specified communication line;

sending a message to the network controller indicating the no answer detection;

accessing transfer data stored in the network controller which is associated with the subscriber to determine how the subscriber has selected to terminate calls when unanswered; and terminating the call in accord with the accessed transfer data.

27. A method as in claim 18, further comprising the steps of:

when the subscriber is currently registered for communication via a specified communication line, detecting that the subscriber's specified communication line is busy;

sending a message to the network controller indicating the busy detection;

accessing termination data stored in the network controller which is associated with the subscriber to determine how the subscriber has selected to terminate calls when busy; and terminating the call in accord with the accessed termination data.

28. A method as in claim 18, further comprising the steps of:

registering said mobile communication unit with said mobility controller;

storing data concerning said mobile communication unit in a visitor location register associated with said mobility controller;

sending a message to the network controller requesting validation of said mobile communication unit;

sending data from said network controller to said visitor location register in response to said request for validation;

storing data in said network controller indicating that the mobile communication unit has registered with said mobility controller.

29. A method as in claim 18, wherein said integrated wired and wireless communication network includes another mobility controller, said method further comprising the step of sending a deregistration message from said network controller to the other mobility controller if said mobile communication unit was formerly registered with the other mobility controller.

30. A method as in claim 18, wherein said integrated wired and wireless communication network includes a home base unit coupled to the specified communication line for providing wireless communication between the portable communication unit and the specified communication line, said method further comprising the steps of:

registering said mobile communication unit with said home base unit;

sending a message over the specified communication line indicating the registration of the mobile communication unit with the base unit; and storing data in said network controller indicating that the mobile communication unit has registered with said home base unit.

31. A method as in claim 18, further comprising the steps of:

sending a message over one communication line indicating that the subscriber is to be registered in association with said one communication line; and storing data in said network controller indicating that the subscriber has registered via with said one communication line.

32. In an integrated wired and wireless communication network, comprising communication lines, a central office switching system connected to the communication lines including at least one service switching point for selectively providing switched communication connections, a mobility controller for selectively providing wireless communications between the central office switching system and wireless mobile communication units, a network controller, separate from the central office switching system and the mobility controller, said network controller being connected to both said mobility controller and said at least one service switching point through at least one service transfer point, a method of selectively routing calls to a subscriber on a communication line and to a mobile communication unit assigned to the subscriber via the mobility controller using a single number assigned to identify the subscriber, said method comprising the steps of:

registering data in the network controller to indicate whether the subscriber is currently available at a specified communication line or via the mobility controller;

in response to a call directed to the number assigned to identify the subscriber, accessing the registration data in the network controller;

analyzing the call to determine if the call meets certain criteria specified by the subscriber and stored in the network controller; and communicating said data from said network controller through said at least one service transfer point to selectively route the call to the subscriber's current location via the specified communication line and/or the mobility controller, as indicated by the current registration data, only if the call meets the subscriber specified criteria stored in the network controller.

33. A method as in claim 32, further comprising the step of terminating the call in a manner specified by the subscriber and stored in the central data base if the call does not meet the subscriber specified criteria stored in the network controller.

34. In a communication network having at least two service switching systems for selectively providing communications between stations, and a central service control means, separate from the service switching systems, for providing call processing instructions to the service switching systems, a method comprising the steps of:

registering a visiting subscriber through one of the service switching systems;

accessing a remote central service control means of another network to obtain service data associated with the visiting subscriber;

storing the accessed service data in the central service control means;

in response a request for service from the subscriber, retrieving the visiting subscriber's service data stored in the central service control means; and instructing the one switching system to provide the requested service based on the visiting subscriber's service data retrieved from the central service control means.

35. In a communication network, as in claim 34, wherein at least one of the service switching means comprises a telephone central office switching system connected to a plurality of telephone lines, and the registering step is performed by transmission of registration data over one of said telephone lines.

36. In a communication network, as in claim 34, wherein at least one of the service switching means comprises a wireless link controller for providing selective communications to mobile communication units, and the registering step is performed in response to a visiting subscriber's portable communications unit registering with the wireless link controller.

37. In a communication network having at least two service switching systems for selectively providing communications between stations, and a central service control means, separate from the service switching systems, for providing call processing instructions to the service switching systems, a method comprising the steps of:

registering a visiting subscriber through one of the switching systems;

storing data in the central service control means indicating that the visiting subscriber is registered through the one switching system;

sending the registration data to a remote central service control means of another network to which the visiting subscriber is normally assigned for storage therein such that the remote service control means will route a call directed to the subscriber to the one switching system.

38. In a communication network, as in claim 37, wherein at least one of the service switching means comprises a telephone central office switching system connected to a plurality of telephone lines, and the registering step is performed by transmission of registration data over one of said telephone lines.

39. In a communication network, as in claim 37, wherein at least one of the service switching means comprises a wireless link controller for providing selective communications to mobile communication units, and the registering step is performed in response to a visiting subscriber's portable communications unit registering with the wireless link controller.

40. In an integrated wired and wireless communication network, comprising communication lines, a central office switching system connected to the communication lines including at least one service switching point for selectively providing switched communication connections, a mobility controller for selectively providing wireless communications between the central office switching system and wireless mobile communication units, a method comprising the steps of:

storing in a network controller arranged separately from the central office switching system and the mobility controller and connected to both said mobility controller and said at least one service switching point through at least one service transfer point, a file containing preprogrammed call processing data for providing one or more special service features to a subscriber assigned to one of the mobile communication units;

receiving a request for a special service feature in the central office switching system from one of the connected local communication lines or in the mobility controller from one of the mobile communication units;

recognizing that the service request originates from said subscriber;

accessing the subscriber's file stored in the central data base to obtain preprogrammed call processing data for the requested special service feature;

providing the requested service feature based on the accessed call processing data via the central office switching system if the request originated in the one local communication line; and providing the requested service feature based on the accessed preprogrammed call processing data via the mobility controller if the request for service originated from the one mobile communication unit via said mobility controller.

41. In a communication network comprising at least two call switching means and a central network controller, remote from the two call switching means, said central network controller storing data controlling operation of the two switching means for routing calls directed to a subscriber selectively to one of at least two points coupled to the network, a routing method comprising the steps of:

detecting that a current call is directed to a number assigned to the subscriber;

accessing the data stored in the central network controller to determine to which of the at least two points coupled to the network the current call should be selectively routed;

if routing of the call to the point determined by the accessed data will incur a charge, sending an announcement to the caller asking if the caller is willing to pay the charge;

collecting information input by the caller;

if the information input by the caller indicates that the caller assents to payment of the charge, routing the call to the point determined by the accessed data; and if the information from the caller indicates that the caller does not assent to payment of the charge, routing the call to an alternate termination point.

42. A method as in claim 41, wherein one of the at least two call switching means comprises a wireless mobility controller for providing wireless communication to and from a mobile communication unit, and if the data stored in the network controller indicates that the call should be routed via the mobility controller, the announcement asks the caller whether or not the caller is willing to pay for air time necessary to complete the call via the mobility controller.

43. A method as in claim 41, wherein one of the at least two call switching means comprises a central office switching system for providing selective connection between local communication lines and a long distance communication system, and if the data stored in the network controller indicates that the call should be routed via the long distance communication system, the announcement asks the caller whether or not the caller is willing to pay for use of the long distance system.

44. A method as in claim 41, further comprising billing the caller for the charge if assented to.

* * * * *